(12) United States Patent
Bird et al.

(10) Patent No.: US 9,195,506 B2
(45) Date of Patent: Nov. 24, 2015

(54) PROCESSOR PROVISIONING BY A MIDDLEWARE PROCESSING SYSTEM FOR A PLURALITY OF LOGICAL PROCESSOR PARTITIONS

(71) Applicant: International Business Machines Corporation, Armonk, NY (US)

(72) Inventors: Paul M. Bird, Markham (CA); David Kalmuk, Totonto (CA)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 13/723,575

(22) Filed: Dec. 21, 2012

(65) Prior Publication Data
US 2014/0181833 A1    Jun. 26, 2014

(51) Int. Cl.
| G06F 3/00  | (2006.01) |
| G06F 9/30  | (2006.01) |
| G06F 9/50  | (2006.01) |
| G06F 9/48  | (2006.01) |
| G06F 9/54  | (2006.01) |
| G06F 12/08 | (2006.01) |

(52) U.S. Cl.
CPC ............ G06F 9/5016 (2013.01); G06F 9/4881 (2013.01); G06F 9/5077 (2013.01); *G06F 9/546* (2013.01); *G06F 12/0842* (2013.01); *G06F 2209/485* (2013.01); *G06F 2209/504* (2013.01); *G06F 2209/5012* (2013.01)

(58) Field of Classification Search
CPC ............................. G06F 9/546; G06F 12/0842
USPC .......................................... 719/314; 712/203
See application file for complete search history.

(56) References Cited

U.S. PATENT DOCUMENTS

| 6,505,229 | B1 | 1/2003 | Turner et al. |
| 7,296,112 | B1 | 11/2007 | Yarlagadda et al. |
| 8,954,409 | B1 | 2/2015 | Kerem et al. |
| 2004/0199734 | A1 | 10/2004 | Rajamani et al. |
| 2007/0256076 | A1* | 11/2007 | Thompson et al. ........... 718/102 |
| 2010/0077449 | A1 | 3/2010 | Kwok et al. |
| 2010/0175107 | A1 | 7/2010 | Sugarbroad |

(Continued)

FOREIGN PATENT DOCUMENTS

CN   102508712 A   6/2012

OTHER PUBLICATIONS

Yan Luo, Shared Memory Multiprocessor Architectures for software IP Routers, Dec. 2003.*

(Continued)

*Primary Examiner* — Lechi Truong
(74) *Attorney, Agent, or Firm* — Terry Carroll; Edell, Shapiro & Finnan, LLC

(57) ABSTRACT

A middleware processor provisioning process provisions a plurality of processors in a multi-processor environment. The processing capability of the multiprocessor environment is subdivided and multiple instances of service applications start protected processes to service a plurality of user processing requests, where the number of protected processes may exceed the number of processors. A single processing queue is created for each processor. User processing requests are portioned and dispatched across the plurality of processing queues and are serviced by protected processes from corresponding service applications, thereby efficiently using available processing resources while servicing the user processing requests in a desired manner.

13 Claims, 8 Drawing Sheets

(56) References Cited

U.S. PATENT DOCUMENTS

| | | |
|---|---|---|
| 2012/0102499 A1 | 4/2012 | Flemming et al. |
| 2012/0151063 A1* | 6/2012 | Yang et al. .................... 709/226 |
| 2014/0181828 A1 | 6/2014 | Bird et al. |
| 2014/0201751 A1 | 7/2014 | Bird et al. |
| 2014/0201757 A1 | 7/2014 | Bird et al. |

OTHER PUBLICATIONS

Akhter et al., "Multi-Core Programming Increasing Performance through Software Multi-threading", Intel Press, Apr. 2006, entire book (360 pages).

Rossbach et al., "PTask: Operating System Abstractions to Manage GPUs as Compute Devices", SOSP '2011, 29 pages.

Barney, "Introduction to Parallel Computing" Online Tutortial, https://computing.llnl.gov/tutorials/parallel_comp/ Last updated Jul. 16, 2012, 47 pages.

Hellerstein et al., "Architecture of a Database System", Foundations and Trends in Databases vol. 1, No. 2 (2007) 119 pages.

Mark Panahi, A Framework for Real-time Service-Oriented Architecture, 2009.

Allen B. Downey, Using Queue Time Predictions for Processor Allocation, 1997, pp. 35-57.

* cited by examiner

PROCESSOR PROVISIONING BY A MIDDLEWARE PROCESSING SYSTEM FOR A PLURALITY OF LOGICAL PROCESSOR PARTITIONS

BACKGROUND

1. Technical Field

Present invention embodiments relate to processor provisioning, and more specifically, to processor provisioning for logically partitioned processors by way of a middleware system.

2. Discussion of the Related Art

Central Processing Unit (CPU) or processor provisioning is a common activity performed in modern computer systems to manage processing workload, e.g., in personal computing devices such PCs or tablets, blade servers, or mainframe type computers. In these applications, available processing capacity is allocated among a plurality of user or system applications and processes. For example, in a real-time operating system (RTOS) available processing power is allocated in units of time, such as time slices, as well as by a process priority. Furthermore, memory may be partitioned on a per process or processor basis, while the processing resources (e.g., processor cores) may be logically partitioned or divided into multiple instances. Processing and memory allocation may be controlled via control tokens or mutually exclusive (mutex) control for concurrent computing processes and memory allocation.

Traditional approaches to workload management have also been incorporated into middleware software systems (MSSs). Workload management capabilities are a key feature for middleware software systems that support mixed workload or multi-tenancy environments (e.g., database servers). Such systems may need to simultaneously support diverse applications from different areas in the enterprise with differing resource and service level requirements. As such, it is important to have the capability to be able to prioritize the execution of different applications in order to facilitate effective resource sharing and to ensure that their processing resources are adequately insulated from each other and able to meet their service level performance goals.

Although there are a multitude of workload management techniques that can indirectly affect the division of resources between workloads (including managing the number of concurrently executing requests and/or mechanisms that alter the priority of threads or processes executing different tasks), the capabilities that have been observed to provide the most predictable level of control and insulation are those that allow the user to exert direct control over the amount of CPU given to the different workloads running on the system. However, such systems do not adequately scale in middleware environments, for example, due to scheduling conflicts that arise as the number processes being serviced increases.

BRIEF SUMMARY

According to one embodiment of the present invention, a method implemented by a computer via a middleware processing system for efficiently allocating workloads comprising a plurality of user processing requests among a plurality of processor cores in a multiprocessor system. A current processing workload is assessed for the plurality of user processing requests. A processing capability of the multiprocessor system is subdivided into a plurality of processing units based on the current processing workload. A plurality of protected processes started by one or more service applications are executing on the plurality of processing units to service the user processing requests such that the number of protected processes may exceed the number of processing units. A portion of a shared memory space is allocated to each of the processing units and a processing queue is generated for each of the processing units, where each processing queue has access to a corresponding portion of the shared memory space. A portion of each user processing request is assigned to one or more of the processing queues. The portion of each user processing request is serviced by one or more protected processes in a corresponding service application as it is released for execution by a corresponding processing queue

DETAILED DESCRIPTION

Figure 1:
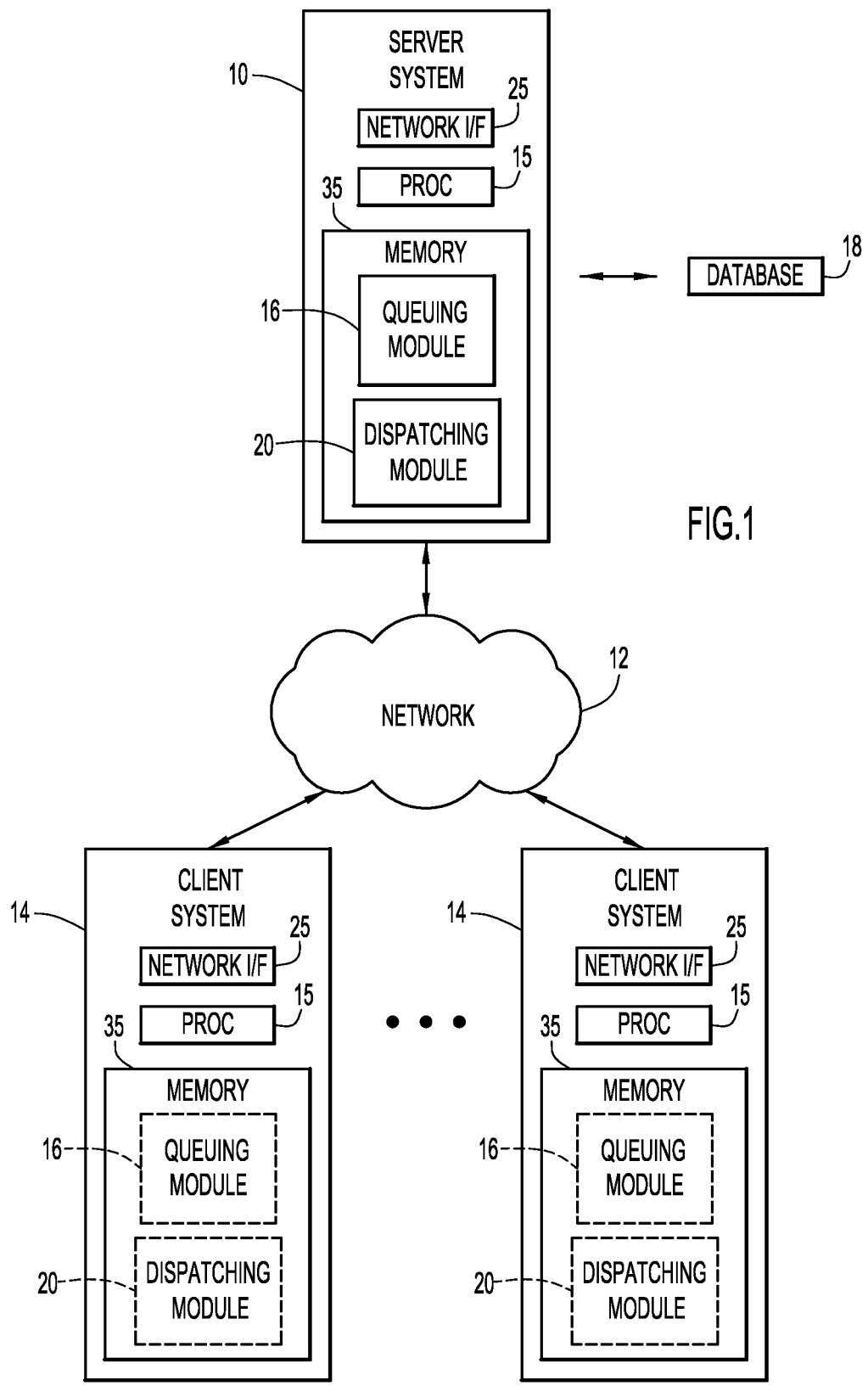
FIG. 1 is a diagrammatic illustration of an example computing environment for use with an embodiment of the present invention.

Present invention embodiments optimize workload processing across a plurality of processors in a multiprocessor environment (e.g., in a server farm). Embodiments described herein use a one to one (1:1) threading model that maps server processes serving user requests onto processing queues with each processing queue allowing a limited number of server processes to execute at a given time (i.e., one server process is allowed to execute for each processing queue). The queues thus map user requests to operating systems (OS) processes that run under protected execution (e.g., in a kernel space).

For example, if three server processes executing user requests are contending for resources on two processors, four queues may be set up for the two processors. A single server process is allowed to execute at a time for each queue across the two processors. Any combination may be set up that efficiently process the three user processing requests. For example, three kernel processes may be set on one processor, or two kernel processes may be set up on one processor and a single kernel process on the other. The user processing is then time sliced across the four queues in a manner that provides that best or most efficient processing of the user processing requests. If a user request does not finish during its queue time slice allotment then the user processing request is recycled back onto one of the queues. Further details of this queuing arrangement are described below.

Common workload management techniques include CPU shares, soft limits, and hard limits. CPU shares allow the user to define the target CPU allocation for a workload in terms of a numeric share value that represents the relative proportion of CPU the workload should receive compared to other workloads on the system. IBM's AIX operating system and Linux' workload manager (WLM) both support the concept of shares. As an example, if Workload A is assigned 400 shares, Workload B is assigned 400 shares, and Workload C is assigned 200 shares for a total allocation of 1000 shares. The relative allocation of CPU between the three workloads would be 40% (400/1000) for Workload A, 40% (400/1000) for Workload B, and 20% (200/1000) for Workload C. If Workload C finishes and only Workload A and B are left running the target allocation would be 50% CPU for each workload, since each represents 400 shares out of a total of 800 shares.

Thus, when the workloads running on the system are competing for CPU time the workload manager ensures that the CPU is assigned based on the shares based target allocation. When the system is not fully utilized and workloads are not competing for CPU, workloads are allowed to consume the idle processing capacity as needed.

The shares concept generally offers the most appealing and flexible model for managing the CPU assigned to different workloads as the share based allocations are relative to which other workloads are running on the system, meaning that the allocations grow or shrink accordingly depending on how many active workloads are running. Allowing workloads access to idle CPU capacity in the absence of competition for the CPU also ensures efficient use of machine resources.

Soft limits behave in a similar manner to CPU shares, except that the CPU allocations for workloads are specified as a fixed percentage of the machine resources, rather than as a relative share. AIX WLM supports soft limits in addition to CPU shares, while Linux WLM does not. With soft limits, idle CPU time may be accessed since it is allocated a "soft" percentage of CPU time. For example, if Workload C consumes only 10% it 20% CPU time allocation, Workload A and Workload B can each command 45% of the available CPU time by sharing Workload C's remaining 10% CPU allocation.

Hard limits provide the capability for the user to specify a strict CPU consumption limit for a workload specified as a percentage of the overall CPU capacity available on the host machine.

Although such workload management capabilities are implemented and available through some operating system workload managers like AIX and Linux WLM, it is advantageous to be able to implement this type of capability directly into the middleware software for several reasons:

By implementing the capabilities in the middleware, consistent support can be provided across all the platforms the middleware supports. For a cross-platform product, workload management solutions that rely on OS facilities differ in terms of capabilities on each platform, and may not be available at all on some platforms. For example, the OS WLM integration available in DB2 for LUW enables CPU shares, soft limit, and hard limit based controls on AIX, CPU shares only on Linux, and has no support on platforms such as Solaris, HP and Windows.

Having the support directly in the middleware also means that the capabilities can generally be configured through administrative functions on the middleware product itself. This can be important in cases where the people and processes that configure the underlying hardware and OS are different from those administering the software (e.g., database administrators vs. system administrators). For distributed middleware solutions this also generally means that the configuration can be administered through a single point of control, rather than needing to be setup individually on each host in a distributed cluster.

Workload management capabilities that are integrated into the middleware can leverage internal state information that would not otherwise be available to make more optimal scheduling decisions (e.g., to avoid priority inversion issues when multiple tasks of different priorities are competing for exclusive access on the same object).

In order to provide middleware based workload control that is sufficiently fine grained to accurately provision CPU usage between jobs, it is generally necessary to implement some form of cooperative task scheduling or time slicing in the software. Under this type of model, jobs are given a short duration of time on the processors and then required to return to a run queue where the software prioritize when the task is dispatched next relative to other jobs waiting to run on the system. Unfortunately, there are significant challenges in implementing such a mechanism, especially in cases where it is being introduced as a new feature on an existing software system.

The typical way to implement such a solution would be by using an M:N threading model where M user threads are managed by the software and scheduled amongst N kernel worker threads with N based on the number of tasks allowed to be dispatched to the actual system CPUs at a time (typically equivalent to the number of CPUs on the system). This model allows the software to effectively manage its own CPU run queues, dispatching only the number of tasks that can be run in parallel at a time by the OS, and provisioning access to the CPU by the priority order in which tasks are dispatched. Historically a user threading model was also beneficial due to the possibility of reducing context switching costs between threads, but with a steady increase in processor speeds, this benefit by and large has been amortized away. On the flip side however, this type of threading model can have significant drawbacks, especially when the goal is to add workload management capabilities to an existing system that is based on a 1:1 thread based or process based model. Specifically:

An M:N model necessitates that worker threads offload blocking activities like network communications and I/O to other threads, and this can introduce additional latencies in the processing that degrade performance when compared to a 1:1 threading model.

Synchronization primitives relying on OS level calls, or implemented as spin locks, need to be rewritten to support queuing of waiting worker threads, and this can have negative performance implications in cases where the synchronization primitives have been highly optimized for the product.

The general costs of re-architecting an existing system to change to an M:N threading model can be prohibitive as many existing subsystems may need to be redesigned from scratch (in addition to the I/O subsystem and synchronization primitives, other mechanisms such as those that rely on signals to drive notifications or asynchronous processing not operate in a user-threaded architecture and would need to be redesigned).

In addition to challenges related specifically to the threading model, there are a number of other challenges that need to be surmounted when implementing granular task management in middleware software:

A middleware solution is forced to rely on cooperative task scheduling (due to the inability to preempt tasks like the OS), and cooperative task scheduling by nature lacks any concept of a predefined preemptive time slice. A task typically yields back to the scheduler when it is required to block on some type of synchronization primitive, I/O, or at some well known yield point in processing. This means that the length of a time slice in such a system varies widely; making it difficult to normalize dispatching in order to ensure the task achieves its desired CPU provisioning. This is an especially important problem when the intention is to support specific CPU limits being imposed on applications.

A second related issue is that a processor intensive task that does not perform any blocking operations in this type of system, needs to explicitly yield to return control to the scheduler; making it very difficult to strike a balance where control can be yielded on a reasonably frequent basis to allow effective control, but not so frequently as to affect the task performance, since it is difficult to judge how to space out the yield calls in the code. This is another factor that can make it difficult to enforce accurate CPU utilization limits where the desire is to provide strict resource isolation for specific workloads.

Scheduling to achieve specific CPU provisioning in middleware requires the tracking of the CPU usage of individual threads running on behalf of particular workloads in the software. The cost of querying the CPU time used for a thread executing a task from the OS is relatively expensive and degrades performance if queried too frequently. A task scheduler by definition may be required execute granular time slices for tasks that perform a lot of blocking operations (consider that in a transactional database system, individual requests may execute in a range as small as tens of microseconds between communication with the client), which means that a middleware based solution often needs to incur undesired overhead to be able to provide the desired provisioning capabilities.

Environments with virtualization, which are becoming increasingly common, increase the difficulty of supporting specific CPU utilization limits on certain jobs, as the CPU utilization calculations vary depending on the CPU capacity allocated to the host by the hypervisor rather than simply the number of cores on the host. Typical middleware systems that do not account for virtualization are unable to enforce correct CPU limits in virtualized environments, as they are calculating the limits based on the assumption of dedicated CPUs rather than micro-partitioned CPUs Having the middleware manage an additional run queues on top of the OS can introduce scalability problems in the case where a single run queue is used (which represents a global serialization point/bottleneck), or difficulties in performing accurate scheduling if the scheduling is split up and managed separately across independent run queues.

In the context of these technical challenges a typical middleware solution chooses to either scale back the overall functionality and accuracy of CPU provisioning offered (for example, by offering a less accurate level of CPU control in order to reduce overhead, and/or eschewing the ability to enforce specific CPU limits in favor of providing only relative prioritization), or instead opt to use OS level facilities that can bypass the challenges of implementing the CPU provisioning within the middleware but also at a cost of the potential benefits mentioned earlier.

A technique for implementing a low overhead scalable CPU provisioning mechanism in a middleware software system is introduced herein. This technique can provide capabilities similar to those capabilities available to an OS WLM without requiring a large scale re-architecture to integrate into an existing system. The technique provides the capability for implementing both accurate CPU shares and CPU limit controls within the middleware platform with low overhead, carrying all the associated benefits of an integrated cross-platform solution described above. The technique uses several novel techniques to overcome obstacles that would normally impede the implementations of such a system without making the tradeoffs discussed above.

An example environment for use with present invention embodiments is illustrated in FIG. 1. Specifically, the environment includes one or more server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, intranet, etc.). Alternatively, server systems 10 and client systems 14 may be local to each other, and communicate via any appropriate local communication medium (e.g., local area network (LAN), hardwire, wireless link, intranet, etc.)

Server systems 10 and client systems 14 may be implemented by any conventional or other computer systems preferably equipped with a display or monitor (not shown), a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, queuing module, dispatching module, browser/interface software, etc.).

Client systems 14 may receive application or other user processing requests (e.g., remote application processing, database queries, remote desktop hosting, etc.) for server systems 10. In another example, the processing requests may be received by the server, either directly or indirectly. The server systems include a queuing module 16 to generate one or more processing queues and service processes to service the processing requests, and a dispatching module 20 to schedule portions of the processing requests across the processing queues. Ultimately, modules 16 and 20 allow CPU processing to be allocated among the processing requests (e.g., from client systems 14). A database system 18 may store information in support of the processing requests (e.g., databases and indexes, user requests, historical and statistical data, etc.). The database system may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, intranet, etc.). The client systems may present a graphical user interface (e.g., GUI, etc.) or other interface (e.g., command line prompts, menu screens, etc.) to allow users to interact with and utilized the features available on server systems 10, and to set up CPU provisioning parameters on server system 10 using the techniques described herein.

Alternatively, one or more client systems 14 may perform CPU provisioning when operating as a stand-alone unit. In a stand-alone mode of operation, the client system stores or has access to the data (e.g., user requests, historical and statistical data, etc.), and includes queuing module 16 and dispatching module 20 to perform CPU process management. The graphical user interface (e.g., GUI, etc.) or other interface (e.g., command line prompts, menu screens, etc.) allows users to interact with and utilized the features available on client systems 14, and to set up CPU provisioning parameters on client systems 14 using the techniques described herein.

Queuing module 16 and dispatching module 20 may include one or more modules or units to perform the various functions of present invention embodiments described below. The various modules (e.g., queuing module, dispatching module, etc.) may be implemented by any combination of any quantity of software and/or hardware modules or units, and may reside within memory 35 of the server and/or client systems for execution by processor 15.

Queuing module 16 and dispatching module 20 implement a granular task scheduler using a 1:1 threading model rather than an M:N threading model to allow seamless integration into existing designs that use a kernel threaded architecture. CPU scheduling is achieved by implementing a run queue mechanism that allows only a fixed number of kernel threads to be dispatched to the OS CPUs at a time (based on the number of parallel threads required to fully utilize the system CPUs). Other kernel threads in the run queues are blocked on wait primitives, creating a similar level of control to a solution using an M:N threading model, but without the need to manage a separate set of user and kernel worker threads. When a running thread yields and returns to the run queues, it selects and unblocks the next thread the scheduler logic indicates is eligible to run (including continuing to run itself if it's at the head of the queue).

In order to avoid the need to re-implement the I/O subsystem or OS primitives, the technique instruments or wraps existing OS calls with callback hooks that inform the scheduler when a thread is about to block or unblock when entering or exiting such an operation. Thus, a new thread can be dispatched from the run queues to the CPU when a currently running thread blocks, or when a thread that is newly eligible to run is added to the run queues, thereby requesting permission to execute. With the thread dispatching mechanism and the 1:1 threading model, threads in the system can continue to issue I/O calls directly, avoiding any latencies that might be incurred by handing off such requests to separate threads as in an M:N threading model. Optimized synchronization primitives can also continue to be used as-is without needing to be redesigned with the associated potential performance implications. Similarly, other existing subsystems, such as those that are signal based, can continue to operate as-is.

Overall this approach prevents the need to re-architect the threading model when adding CPU provisioning capabilities to an existing system that uses a 1:1 threading model, greatly reducing the development costs of such an effort. By doing so, the system can retain the key benefits of a 1:1 threading model including avoiding the need to offload I/O operations to a separate subsystem, and or to re-implement highly optimized synchronization primitives with an extra layer of logic for managing control in the user space, thereby ensuring that the workload management capabilities can be provided with minimal overhead.

In order to provide both an accurate level of CPU control without trading off possible scalability, the system uses a hybrid run queue mechanism that combines the scalability aspects of multiple independent run queues with the scheduling accuracy benefits of using a single run queue.

In order to avoid potential bottlenecks on system scalability, a set of independently serialized run queues are used to dispatch processing requests, eliminating any global serialization points. The number of run queues in a typical embodiment would be set to be equivalent to the number of CPUs present on the host environment. In some implementations, having a single run queue per processor or processor core can reduce or eliminate latency due to the blocking of one request while another request is accessing a single queue (i.e., when requests conflict one process has to wait until the single run queue becomes available). Simple load balancing such as a round robin dispatching or scheduling of incoming threads/tasks, or adding new tasks to the shortest queue can be used to ensure the run queue lengths remain relatively even.

In order to ensure accurate scheduling, scheduling metrics for individual jobs or workloads, such as share values and recent CPU consumption, may be stored in a global data area that is shared across all run queues rather than per run queue. Such historical data can be used to prioritize scheduling for known processes via the queues to optimize CPU utilization across available processors to achieve the best user and administrator desired outcomes. Contention for access to the shared storage or memory area is limited by implementing these metrics as atomic counters that use simple compare-and-swap instructions rather than heavier weight mutexes or latches to ensure minimal potential for bottlenecks. In other words, machine instructions are employed to update the individual data fields without locking the entire global data set, as would be the case if a semaphore or mutex were employed. Usage of common scheduling data implicitly ensures that the prioritization of tasks in each run queue is based on consistent up to date information, and is therefore implicitly balanced, thereby eliminating both the need for additional complex load balancing logic and eliminating any accuracy tradeoffs from using separately serialized scheduling data that would not be in balance (depending on the distribution of work); leading to less overall accuracy in CPU provisioning.

In order to implement reliable cooperative time slicing or processing resources, while sidestepping roadblocks in typical implementation mentioned above, one embodiment of the present invention introduces the concept of a lightweight conditional yield check that is based on an offloaded global clock count. The time slicing mechanism operates by having a global timer thread that increments a global clock counter (e.g., as the variable global_clock) on a defined time slice interval. For example, a typical embodiment might select 10 milliseconds (ms) as the time slice interval, similar to a typical OS time slice. Other time slice intervals may be employed or varied among queues depending on the runtime environment or based on compiled statistics. For simplicity, the global clock may be some multiple of the actual clock (e.g., clock tick may be accumulated or made less granular such that the global clock increments once each ms).

A thread running a task on the system caches the current clock value (e.g., as the variable thread_clock) of the global clock count in thread local storage. The system or thread is then able to perform checks on whether the thread's current time slice has expired by performing a simple clock check (e.g., whether the locally cached counter matches the current global clock count or difference in the global clock count). For example, a clock check may determine whether the thread_clock variable is greater than or equal to the global- _clock variable. Other types of simple Boolean tests against the global clock may be used to test thread timer expiration and are known to those skilled in the art.

By using this technique to perform thread execution timing, it becomes feasible to place the timing checks at very frequent intervals within processing intensive areas of code without requiring precise timing checks and without impacting the overall performance of processing operations. Since the yield check is conditional, it only actually yields the current time slice if it has found to have expired, meaning that reliable and consistent time slice boundaries can now be enforced so long as the conditional yield checks are hit with at least a minimum frequency. This completely sidesteps the issues with code paths either yielding too frequently and degrading performance, or not yielding frequently enough and degrading control.

With the ability to enforce a relatively accurate time slice boundary, a relatively reliable level of control may be maintained over CPU provisioning without being subject to unbounded variability in time slice lengths and complexities with how to space out yield points in the code. This is particularly critical for providing reliable CPU limit capabilities where the goal is not just to subdivide available CPU capacity fairly between queued work, but also to ensure that the CPU used by specific workloads does not exceed a certain utilization threshold.

In order to track the CPU time used by threads running tasks on the system, one embodiment of the present invention leverages both the 1:1 threading model and the previously mentioned time slicing mechanism in order to implement an optimized method for CPU time metric collection. Specifically, the average time slice length is tracked for a particular task based on a recent moving average for task execution time. If the current time slice is below a target threshold (e.g., 500 microseconds (μs) in a typical embodiment), a scheduling process starts measuring the CPU time on every Nth time slice rather than every time slice in order to reduce the number of measurements per task, thereby reducing the time checking overhead relative to productive task execution. This technique is feasible due to the fact that a 1:1 threading model is being run, and as such, the same kernel thread continues to execute the same task on successive time slices until completion, allowing additional latitude in choosing when not to update the CPU time metrics for every time slice.

A challenge when using this type of metric collection mechanism is ensuring that if the average time slice length suddenly increases, the system can flag it, and not let the task inadvertently consume a large amount of CPU time before the scheduler can compensate. In order to solve this potential problem, a rule may be added to the time slicing model such that when a time slice ends due to a time slice boundary being hit, rather than due to a blocking operation such as an I/O call, the actual CPU consumption time for the slice is measured and the time slice metrics are updated, regardless of the stored average time slice length. This technique does not have an appreciable performance impact since the time slices are relatively long (e.g., a coarse value of 10 milliseconds) relative to the metric collection process.

This method of metric collection makes the CPU timing mechanism both low cost and robust so that various timing models can be implemented. For example, in a model where the average time slice length is 20 μs, due to frequent blocking operations, sample times may be every 10 or 20 time slices so that the time is measured every 200-400 μs, thereby amortizing down the added overhead. If however, a large 10 ms (10000 μs) time slice is encountered, a time slice boundary would be crossed, thereby initiating an immediate CPU query and the scheduler decision is updated as opposed to continuing to skip CPU measurements only to discover after the fact that a task was unintentionally allowed to run for an order of magnitude longer than desired.

A basic CPU limit implementation could involve tracking the accumulated CPU usage for each workload within a particular defined time interval or scheduling cycle, and preventing further dispatches once a workload has exceeded its relative limit until the beginning of the next scheduling cycle. A scheduling cycle in a typical example embodiment of the present invention may be 0.5 or 1 second, i.e., an interval that strikes a balance between queuing and dispatching/scheduling (e.g., by way of queuing module 16 and dispatching module 20) ensuring a balance between responsiveness and low CPU overhead. One possible limitation to this implementation is that it does not account for tasks currently dispatched and running when the time limit is hit, and therefore allows the current tasks to run until their next time slice boundary.

In order to prevent the potential chronic CPU runtime spillover caused by this effect, one embodiment of the present invention implements CPU limits by assuming the next time slice executed by a thread is similar to the previously executed time slice, and makes a predictive decision about whether that task should be allowed to run during the current scheduling cycle based on that assumed time slice value. In other words, a determination is made whether or not that thread fits within the current scheduling window. This scheduling technique has the effect of evening out the likelihood of cases where there is overshoot or undershoot of the target scheduling window.

If a thread is moved or "bumped" to the next scheduling window, the duration of which may be unknown at the time the bump is made, the time slice boundaries will vary slightly from the target boundary. To compensate for such boundary timing errors, the technique implements an error correction facility that computes the error by comparing the accumulated CPU usage for a workload at the end of a scheduling cycle with its target CPU limit. If the CPU limit was encountered, the limit in the next scheduling cycle is adjusted to compensate for any amount of over or under shooting of the limit in the previous scheduling cycle The combination of the reliable time slicing and accurate CPU usage metrics in the embodiments of the present invention described herein, as well as the usage of predictive dispatching and error correction mechanisms, ensures that accurate CPU limit enforcement can be achieved when operating within the context and limitations of a middleware software system.

A basic CPU time limit implementation computes CPU time limits by assuming dedicated CPUs and computing a CPU time limit that a workload may receive during a particular scheduling cycle as a percentage limit of the total scheduling cycle length multiplied by the number CPU cores (i.e., Δ cycle length×#CPU cores). This calculation is effective in non-virtualized environments, but may not produce correct results when dealing with environments where shared CPU capacity is being micro-partitioned and the host is only receiving fractional CPU usage.

In order to support virtualized environments, one example embodiment avails itself of OS specific Application Interfaces (APIs), when available, to determine the total CPU capacity that was available to the virtual host over the most recent scheduling cycle. The CPU capacity value is then used in the CPU limit calculation, as opposed to simply assuming the available capacity is the scheduling cycle length multiplied by the number CPU cores (i.e., Δ cycle length×#CPU cores).

This ensures that present invention embodiments can provide accurate limits in virtualized environments as well as non-virtualized environments. In a virtualized environment a hypervisor controls access to hardware resources. The basic error correction mechanism used for general CPU limits also implicitly helps to compensate from any inaccuracy resulting from changes in capacity the hypervisor makes between scheduling cycles.

Another potential benefit of the embodiments of the present invention described herein is that a middleware based workload manager can leverage internal state information to avoid priority inversion for subsystems that may experience high contention between workloads of differing priorities as described above. To further elaborate, a flag may be passed to the dispatching logic to indicate whether a thread requesting a time slice is holding a resource being requested by higher priority threads. In this case the dispatching logic would respond by placing this time slice request at the front of the run queue so that it will be given preferential priority to minimize the amount of time the priority thread waits on the run queue. The bump decision may be made under the assumption that the longer the resource holding thread waits, the longer it will hold onto the key resource and potentially impact other higher priority threads that require the same resource. The flagged resource may be a mutex, latch, or any other kind of widely contended synchronization resource on the system).

The technique further allows tasks that have just obtained a key resource or synchronization point to jump to the front of the run queue irrespective of their priority, ensuring that a low priority task holding the resource does not degrade the performance of high priority processes that may be waiting for the resource. Thus, by implementing CPU provisioning in middleware, the queuing and dispatching logic has information about thread resource usage that is not available to OS based workload managers, thereby enabling re-queuing options that are not available to such OS based workload managers. Having a workload manager within the middleware platform itself also opens up further potential optimizations in other embodiments based on internal information such as which tasks are causing the most contention and between which internal resources.

A summary of the basic framework of the techniques described above provide the capability for implementing both accurate CPU shares and CPU limit controls (i.e., CPU provisioning) within a middleware platform with very low overhead, carrying all the associated benefits of a middleware integrated solution (consistent platform support, ease of configuration, and the possibility for internal optimization), while eliminating the majority of the tradeoffs this would imply in terms of accuracy, performance overhead, and cost of implementation. Additional details of the various embodiments described above are further described below.

In order to facilitate understanding of the technique described above, a specific example is now described. By way of example, one embodiment of the present invention is described for a workload management dispatcher (WMD) capabilities implemented in DB2® Linux/Unix/Windows (LUW) environment in order to demonstrate how an example embodiment may operate in the DB2 environment. First, a threading model is generated and integrated with OS primitives, i.e., dispatcher control flow operation as implemented by queuing module 16 and dispatching (scheduling) module 20 (FIG. 1).

For the purpose of description a unit of processing for one or more processing requests to be performed over a single or multiple time slices by the processing suite is referred to herein as an "agent" (e.g., engine dispatchable units (EDUs) in DB2 parlance). Listing 1 below, lists dispatcher logic (e.g., as implemented by dispatching module 20):

When dispatcher logic is active:
Any agent threads starting to process a request go through the dispatcher logic to obtain permission to execute.
Assuming a dispatch concurrency level of N
The first N agent threads are allowed to execute
Any subsequent agent threads ready to run, add themselves to a dispatcher run queue and block to wait for one of the running threads to complete its current dispatch interval
Dispatched or executing agents reach the end of their current interval (time slice) and dispatch the next waiting agent off of their run queue when they:
Reach the end of their assigned dispatch interval (i.e. by yielding their current time slice), or
Block on a resource (e.g., a lock, I/O wait, etc.)
When an agent gave up its interval in order to block or wait, and is ready to begin executing again, the agent rejoins a run queue and waits to be dispatched again.

Figure 2:
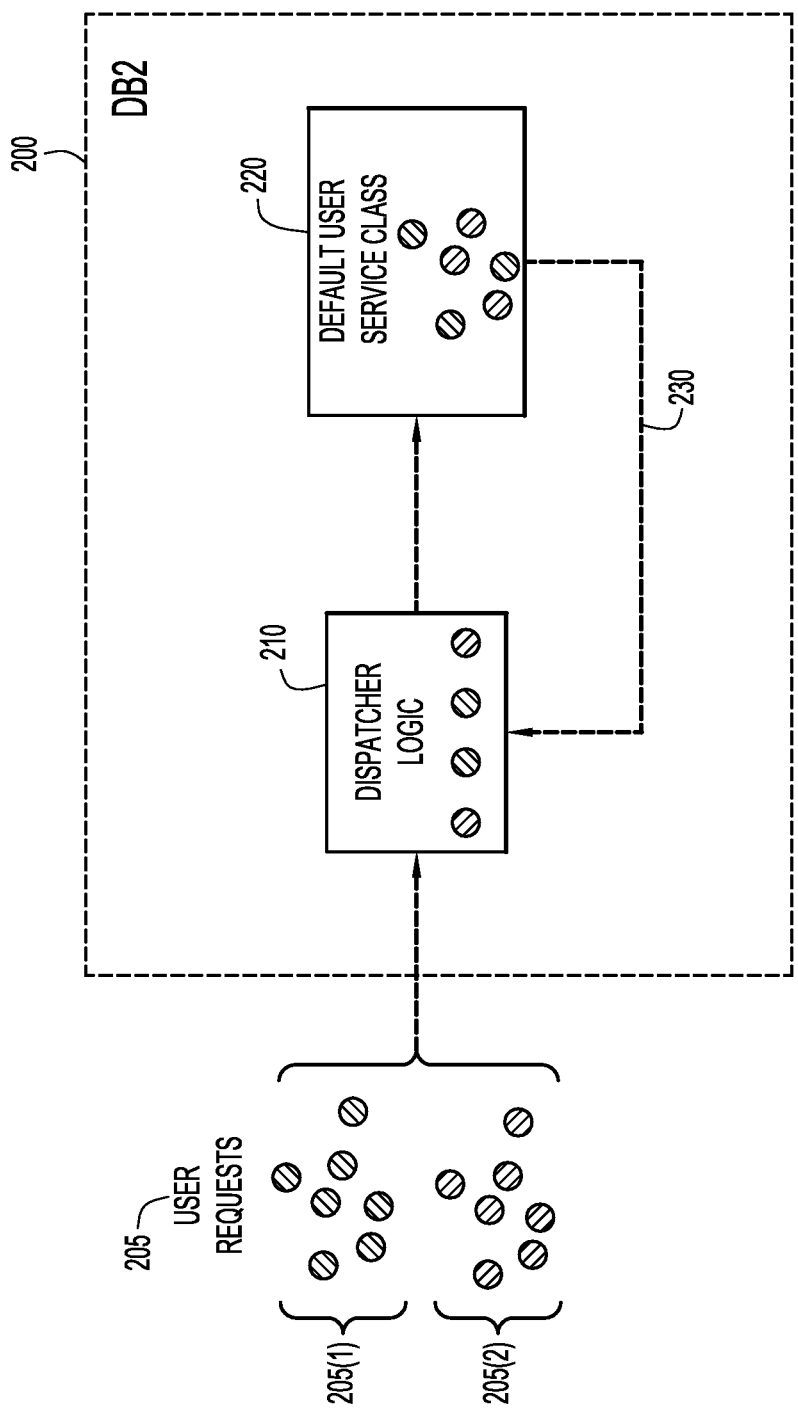
FIG. 2 is a process flow diagram illustrating a manner in which user requests are processed according to an embodiment of the present invention.

This process is further illustrated in FIG. 2 for a DB2 system. The ability of the WLM dispatcher to control the allocation of CPU between active threads on the system comes from the fact that it restricts, to a fixed concurrency level, the number of threads that are allowed to be dispatched and executed in parallel. By doing this the dispatcher is able to control which threads are active against the CPUs (and how often) when under high CPU load.

A plurality of user processing requests 205 is received for processing by a DB2 system 200. System 200 is implemented by a multiprocessor system, and user processing requests 205 are processed by dispatcher logic 210 (e.g., queuing module 16 and dispatching module 20). The user processing requests or agents 205 are divided into requests 205(1) from a first user and 205(2) from a second user; each with different hatching as viewed in FIG. 2. Queuing module 16 assesses the current processing workload for the plurality of user processing requests and subdivides the multiprocessor system into queues and associated servicing threads on a per processing unit basis. Every agent 205 goes through dispatcher logic 210. Only N agents are dispatched at a given time, while other agents wait in a queue. The dispatched agents execute according to a default user service class according to each user request for agents 205(1) and 205(2). Service classes are explained hereinafter. Each agent executes during its corresponding dispatch interval. At 230, each agent, upon reaching the end of their execution interval, either terminates or "wakens" the next queued agent and re-enters a run queue to await dispatch by dispatcher logic 210. This concept is further illustrated in FIGS. 3a and 3b.

A preferable dispatch concurrency limit, N, is a concurrency level that provides enough thread parallelism to enable DB2 to fully utilize the CPUs on system 200. The dispatch concurrency limit ensures that no loss of efficiency occurs when enabling the dispatcher, and therefore no loss in throughput (besides the small path length overhead the dispatcher infrastructure incurs). It also ensures the dispatcher retains the maximum amount of control possible in terms of its ability to select which threads are dispatched when.

Figure 3B:
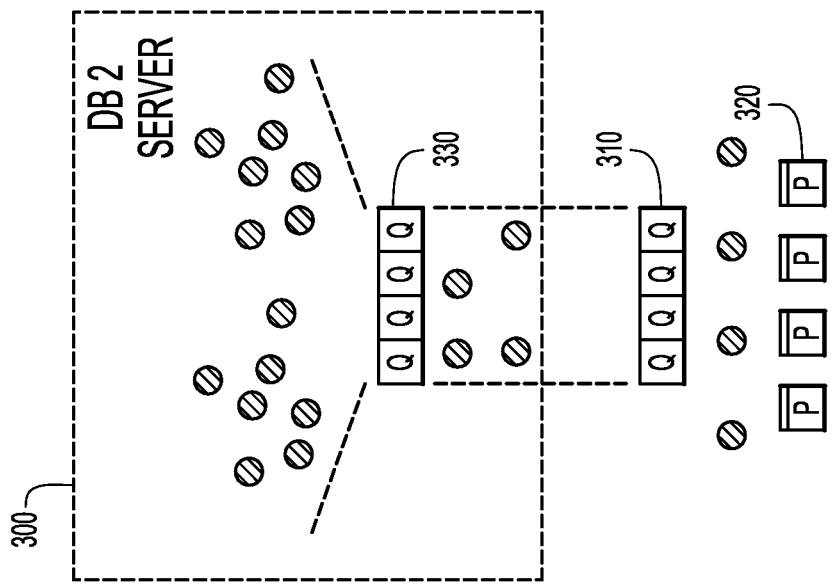
FIGS. 3A and 3B are diagrammatic illustrations of operation of runtime dispatching queues according to an embodiment of the present invention.
Figure 3A:
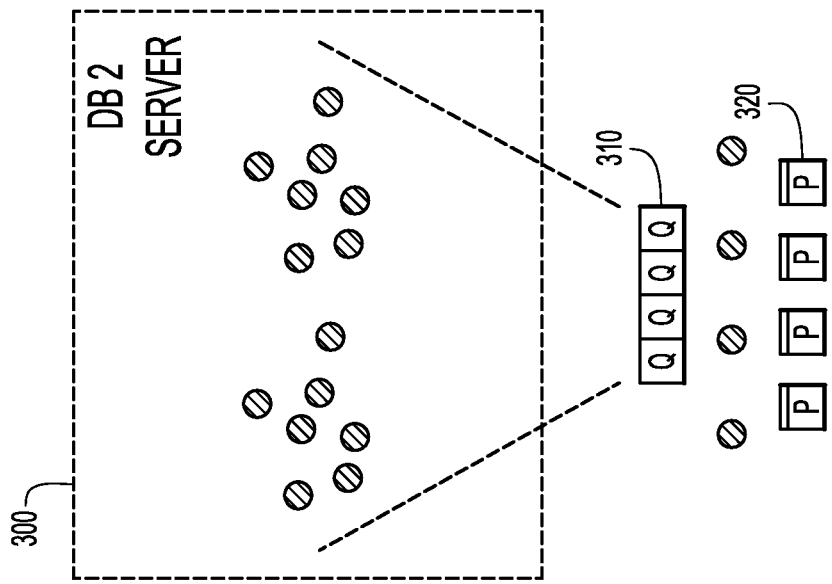

FIG. 3a illustrates a system without a WLM dispatcher. In this example, EDUs 300 are "stuffed" into run queues 310 for processing on processors 320, which precludes the middleware server from controlling the amount of CPU resource given to each thread. For example, EDUs in FIG. 3a are queued without dispatcher logic which leads to an arbitrary division of CPU between them because no decision is made with respect to the characteristics of a particular EDU. In contrast, FIG. 3b illustrates dispatcher run queues 330 for which EDUs 300 correlate, or for simplicity, may be same as run queues 310. However, in FIG. 3b dispatcher decisions (e.g., via dispatcher logic 210 (FIG. 2)) are made before queuing EDUs 300, thereby achieving the desired CPU allocation as well as additional processing efficiencies described herein.

Allowing a too high concurrency limit, while ensuring full utilization of the CPUs, reduces the amount of control the dispatcher has over the workload, as well as adds potential for additional resource contention between running threads. Too restrictive a concurrency level, on the other hand, may cause the CPU capacity on the system to be underutilized and reduce overall throughput.

A theoretical concurrency limit is the raw number of parallel processors on a system (which corresponds to the number of threads the OS can actually dispatch in parallel), but in practice a concurrency limit may compensate for latencies incurred between the time a blocked thread posts and the time when the OS actually dispatches the next thread. In this example, four processor 320 are shown and enable a concurrency limit of four (i.e., N=4)

With given dispatch intervals from the dispatcher run queues 330, the WLM dispatcher logic 210 makes scheduling decisions based on external attributes associated with DB2 service classes. To the WLM Dispatcher, each DB2 service class represents an individual "priority class" for dispatching purposes. By dispatching agents from particular service classes more often than other service classes, the dispatcher is able to control how much CPU time each receives relative to the others, and thereby allocate CPU in such a way as to match the externally configured settings.

Figure 4:
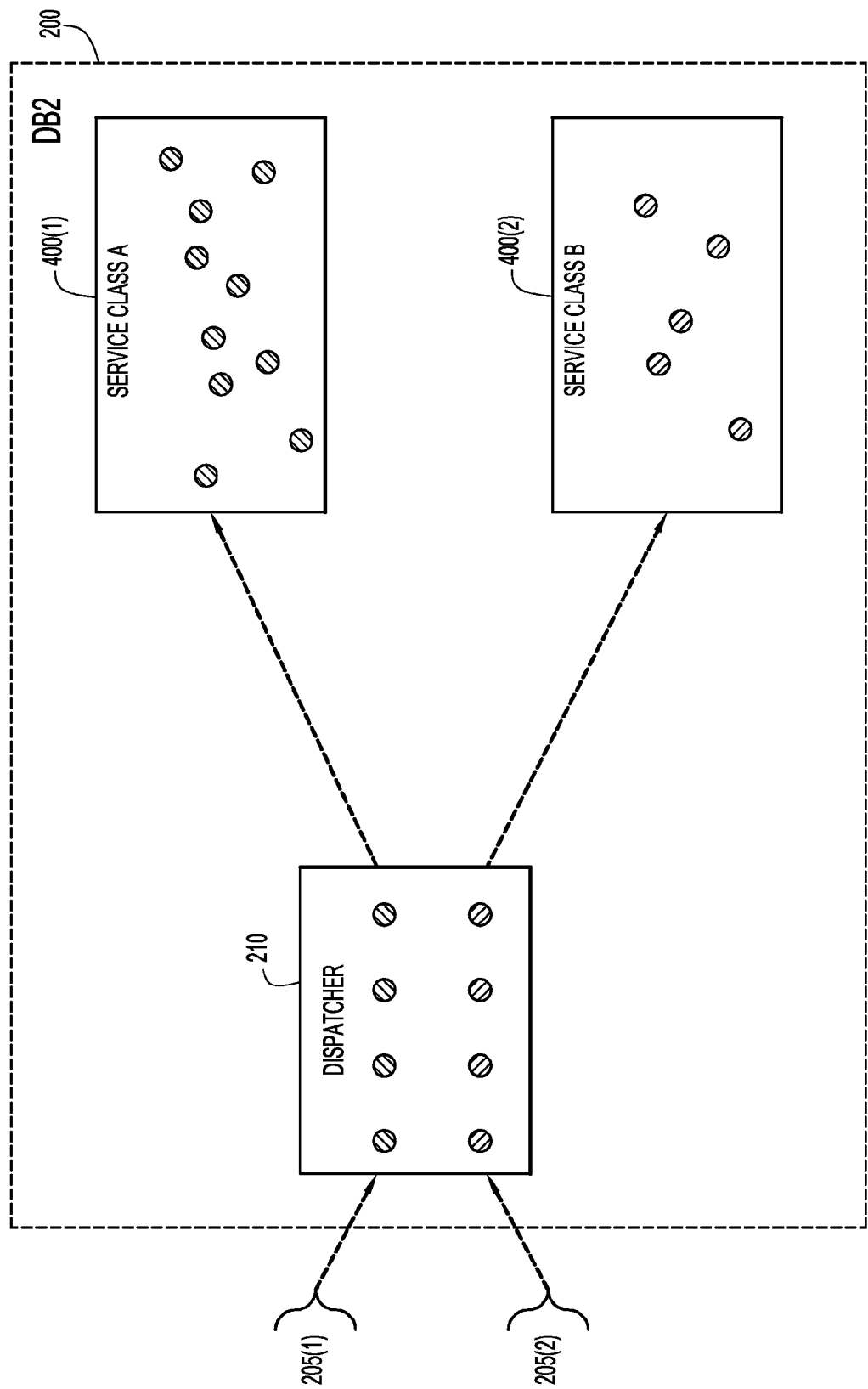
FIG. 4 is a diagrammatic illustration of operation of runtime dispatching queues when service classes are employed according to an embodiment of the present invention.

FIG. 4 illustrates the concept of service classes. The figure shows a basic model of how dispatcher 210 achieves service differentiation in terms of the amount of CPU time allocated to agents 205(1) and 205(2) running via two different service classes 400(1) and 400(2). Dispatcher 210 tracks the accumulated CPU time consumed by agents executing in each service class and resets the aggregate metric at a predetermined time interval (e.g., every second). This repeating period is referred to as the "scheduling cycle," as mentioned above. Thus, at any given point in time, the service class that is computed as the farthest away from its target allocation within the most recent scheduling cycle can be identified (the calculation performed is based on the accumulated CPU time consumed in the current scheduling cycle relative to the target allocation for the service class).

When selecting the next agent to run from its corresponding run queue, the dispatcher logic 210 selects an agent from the service class that is the furthest away from its target allocation. This ensures the allocation of CPU time between service classes tracks as closely as possible to the target allocation, irrespective of variations in the lengths of the individual intervals executed and the characteristics of the individual workload.

In addition to the basic scheduling mechanism described above, the dispatcher 210 also provides the ability to enforce strict CPU percentage (%) utilization limits on particular service classes (an example in the context of the scenario in FIG. 4 would be a 75% CPU limit on Service Class A 400(1)).

In the scenario illustrated in FIG. 4, the dispatcher continues to operate in the same manner described above, except that once a service class has exceeded its CPU time limit relative to the current scheduling cycle, the dispatcher does not dispatch any further agents waiting to run from that service class until the next scheduling cycle begins. This ensures that over time the service class respects the imposed limit.

The dispatcher integrates with low-level "primitive" OS operations via functional hooks or dispatcher "callbacks" integrated into the DB2 Operating System Services Layer (OSSL). These hooks ensure that any thread under dispatcher control calls back into the dispatcher logic at any time the thread is about to enter or exit a blocking operation. This call back notifies the dispatcher when a thread that is currently running is about to give up its CPU time slice, as well as when a thread that was previously blocking requires the CPU again, and further allows the dispatcher logic to perform the appropriate scheduling operations to ensure the desired concurrency level is maintained for running threads on the system processors.

Figure 5:
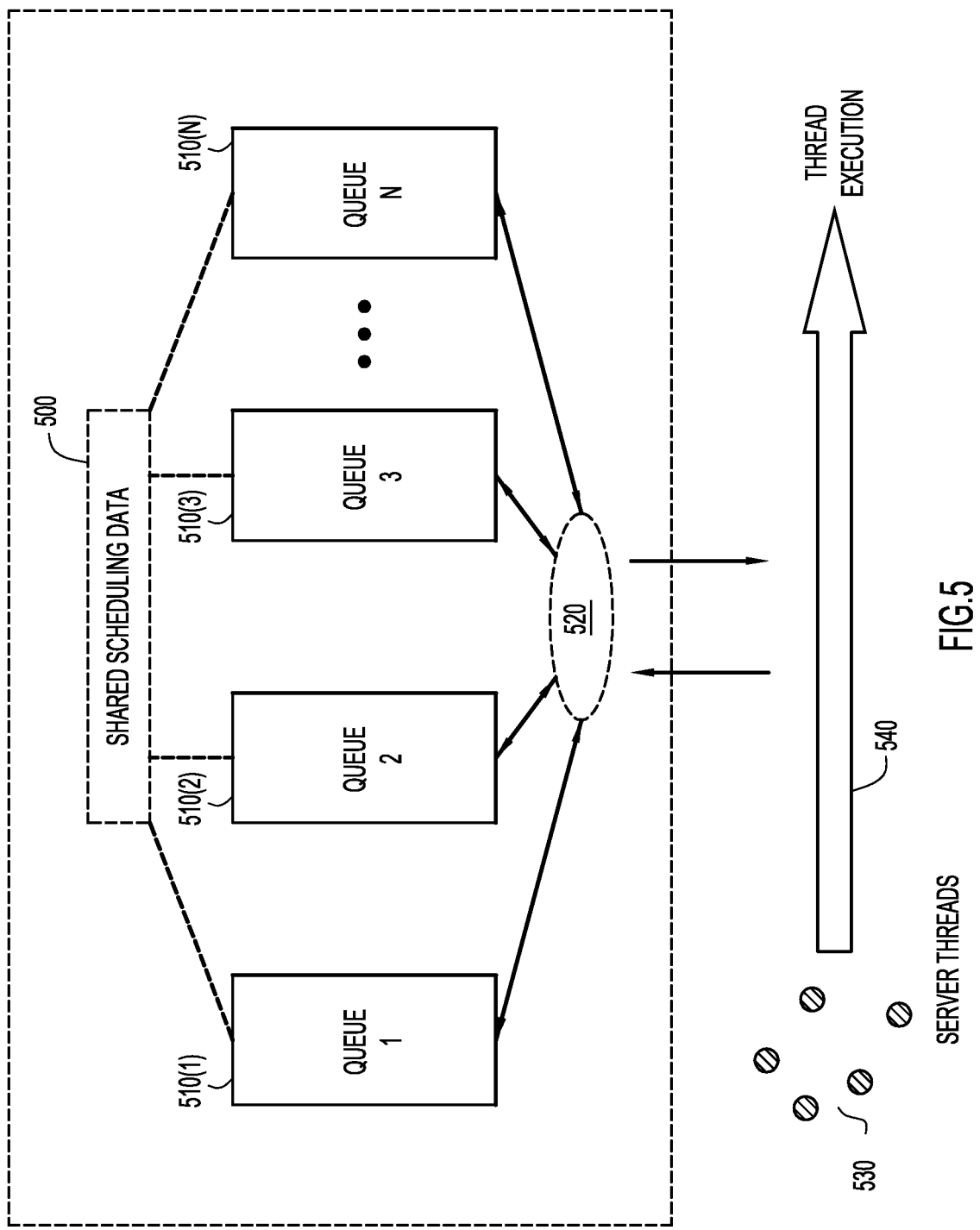
FIG. 5 is a flow diagram illustrating a manner in which CPU processing is allocated in a multiprocessor environment according to an embodiment of the present invention.

FIG. 5 illustrates an example dispatcher framework that allows the use of multiple run queues in order to reduce global serialization impacts on running work. The framework includes shared scheduling data 500, a plurality of run queues 510(1)-510(N) and scheduler logic 520 (e.g., as implemented by dispatching module 20). Each run queue 510 is responsible for managing a subset of the global dispatch concurrency allowed on the system (e.g., as implemented by queuing module 16) with each run queue having its own serialization. The threads have associated requests and agents 530. Agents 530 enter one of the run queues to request dispatch, and are either allowed to run (if the concurrency limits for that run queue have not yet been met), or are forced to queue and wait for a dispatch interval to become available if scheduler logic 520 has already distributed all its available dispatch intervals. To enable scalability and reduce contention, one run queue object is allocated per physical CPU core (e.g., as available to DB2 on a given host).

An individual priority class object is allocated within each run queue object 510 for each service class or workload on a database (allowing the avoidance of global serialization). Scheduling data 500 for each queue 510 is shared across all the run queue objects 510 by default, with the priority class in one of the run queues designated to contain the master scheduling data 500, and all other priority classes referencing the scheduling data in that priority class. The fields used in the scheduling data 500 are implemented as atomic counters to allow parallel access for incrementing without requiring full latch or mutex based serialization.

This model allows a single global view of the resource consumption per service class to be maintained, which greatly simplifies the process of load balancing across run queues, while still avoiding the global serialization associated with queuing using only a single run queue. Because CPU usage and limits for the priority classes are tracked globally across run queues, this has the effect of automatically compensating for any CPU usage skew that would otherwise occur between tasks dispatched by different run queues. The tracking also ensures that the effective priority value for the workload is constant across all the run queues and reflects the most up to date metrics on the system. When enforcing CPU limits, the tracking helps ensure that all the available CPU is consumed on a workload during a particular scheduler cycle without needing to look for an individual run queue where that workload still has time available. Load balancing logic aids in a reasonable distribution of queued tasks from a specific workload across run queues, and affects only the contention profile of execution rather than the accuracy of CPU provisioning.

The time slicing mechanism introduced for the WLM dispatcher 210 may be a frequency based model used to impose a roughly reliable maximum duration for a dispatcher time slice, which helps to ensure that the dispatcher can maintain a minimum degree of dispatching accuracy. Based on test lab experiments, a target duration of 10 milliseconds is reasonable for a dispatcher time slice. The 10 ms time frame was chosen to achieve a reasonable balance between accuracy and overhead, for example:

- in terms of accuracy, a 10 millisecond interval on 1 processor, with the default scheduling cycle of 1 second allows control of CPU utilization at a granularity of 1% increments, which is a reasonable level granular control that can be externalized to middleware for CPU limits (e.g., in a DB2 implementation).
- a 10 millisecond interval is infrequent enough to incur no measurable performance overhead on the system when enabling the dispatcher. By way of example, and to put the 10 ms number in perspective, a representative On-Line Transaction Processing (OLTP) workload execute on an average time interval in the range of 50 µs due to frequent client-server communications, and this incurs a throughput overhead in the range of 2-3% of transactions completed under test conditions (assuming that no proactive or beneficial CPU allocation adjustments are made). The granularity we have chosen here is several orders of magnitude more coarse than this level.

To implement the above, the concept of a WLM Timer thread is introduced. The WLM Timer thread operates (e.g., at the DB2 instance level), and has the purpose of incrementing one or more clock counters as described above in an instance global control structure on a defined frequency. The following counter is used and shown in a pseudo "C" programming language construct below:

globalStruct→checkPointTimerCount

The variable checkPointTimerCount is an arbitrary variable that holds a clock count.

Individually executing agents or kernel threads (e.g., EDUs) cache the current values for the counter in their thread local storage. Any time an agent reaches a dispatcher yield checkpoint within the DB2 code, the agents check their local copy of the checkPointTimerCount against the global copy in the global control structure to see if there is a match. Accordingly, when the clock count matches or exceeds the requisite count, the thread will yield execution. Yield checkpoints are placed in any areas of extended processing in the code. These yield checkpoints are generally hit frequently enough that the values typically do match in the vast majority of cases, in which case no further action is performed.

If the values do not match however, a time slice boundary is considered to have been hit, and the thread calls into the dispatcher logic to place itself back on the run queues to wait for the next available time slice. By having frequent conditional yield checks instrumented in the middleware code, reliable granular time slice boundaries are enabled without risking the performance impacts of hitting time slice boundaries too frequently.

A separate kernel thread is used to implement the timer itself to ensure that the thread would never be able to get blocked on latches or other synchronization primitives and hence would be able to increment the clock count on (or as close as possible to) the desired boundary. Laboratory experiments indicate that the timer thread can become starved for a non-trivial period of time when the system is under very high CPU load (which measurably impacts dispatcher accuracy when enforcing time slice limits and in extreme cases allowing intervals to run nearly an order of magnitude longer than they should for CPU bound work). For this reason, in installations that support it, the thread may be assigned an absolute or real time priority, ensuring that it can be scheduled first by the OS when it needs to increment the clock count.

Since CPU time measurement can carry a relatively large overhead, special allowances are made to reduce the overhead for cases where a thread is executing very frequently or for short duration time slices. A "time sampling frequency" optimization may be implemented by designating a value of 20 time slice units in order to indicate that sampling occurs once every 20 time slices. The time sampling frequency is used to determine:

- how often the CPU time is measured when under the threshold time slice length (T);
- the period of a moving average ($X_{AVG}$) updates for recent time slice CPU times that each thread maintains in order to evaluate a smoothed average for recent slice execution interval lengths; and
- the minimum number of initial time slice samples that are required before optimization of the time sampling frequency starts.

A time sampling threshold, T, is defined which represents a threshold for time slice length below which optimization within the dispatcher software initiates. A heuristically determined threshold value of 500 microseconds may be used by default and subsequently updated.

If a thread's average interval length ($X_{AVG}$) drops below the time sampling threshold, T, measurements of CPU time are taken on the time sampling frequency instead of on each individual time slice. To ensure accuracy, there is no sampling and estimating—rather multiple time slices are simply measured at once instead of individual time slices when the average interval length is very short. This reduces the cost of obtaining CPU time in these cases by an order of magnitude and yields a measurable improvement in OLTP workloads that use very short time slices (for reference a 1-2% throughput improvement was measured on an internally maintained performance benchmark).

The optimized sampling mechanism is immediately disengaged if an agent enters the dispatcher through a yield checkpoint, thereby ensuring that the scheduling mechanism accurately handles cases where an agent thread suddenly transitions to a CPU intensive code path where it may yield its dispatch interval infrequently.

This entire optimization is feasible due to the usage of a 1:1 kernel threading model for the dispatcher which ensures that a particular task continues to execute successive time slices using the same kernel thread, allowing the middleware to bypass measuring the CPU time on every time slice and still maintain viable metrics for scheduling purposes.

CPU limits are implemented in the WLM Dispatcher 210 by imposing a maximum limit on the CPU time consumed by a service class over a given scheduling cycle. In a typical embodiment, a 1 second scheduling cycle could be used. In many WLM solutions including AIX WLM, Linux WLM, DB2 WLM, service classes are subdivided into superclasses and subclasses. The system is divided into superclasses, and each superclass is divided into a set of subclasses. The shares and limits employed by the techniques described herein and configured via the dispatcher may be set at the superclass and subclass layer. When a service subclass or superclass has a CPU limit configured, the maximum amount of CPU time the corresponding dispatcher priority class is allowed to consume in the next scheduling cycle (m_maxCycleTime) is computed based on the CPU limit as a percentage of the total CPU time available to DB2 in the scheduling cycle.

A dedicated scheduling thread is responsible for computing the specific CPU limits which are calculated as follows for each individual priority class:

Max cycle time=% CPU limit×Available cycle time

Available cycle time=Scheduling cycle length×# physical cores available to DB2

During the scheduling cycle, a check is made for the presence of a maximum cycle time limit any time there is an attempt to dispatch a new task within a particular priority class. Once the cycle time limit has been exceeded, the priority class is removed from the run queues, and any further agent threads waiting to dispatch on that priority class are configured to queue and wait. In the case of superclass level limits, all priority subclasses in the relevant priority superclass also are removed from the run queues.

At the beginning of the next scheduling cycle, the scheduler thread resets the CPU consumption for all priority classes and dispatches any agent threads queued within priority classes that exceeded their limits during the previous scheduling cycle.

One particular technical challenge in the implementation of CPU limits relates to the handling of very restrictive limits at high levels of thread or task concurrency. When the maximum CPU time allowed for a given priority class in the next scheduling cycle is restrictive enough, and enough agent threads are contending to be dispatched on that priority class, it is possible that some subset of these agents each be allowed to execute only a single time slice before the limit for the cycle is exceeded. Because it is not known in advance how much CPU time each time slice will consume before it has been executed, and because multiple agents can be dispatched in parallel, an estimated time slice length is relied upon and is based on the previous time slice for which each thread executed, in order to decide how many agents to dispatch in an attempt to come as close as possible to the target CPU usage. Inevitably this concept introduces a small but non-trivial degree of error in any single scheduling cycle since the number of threads dispatched could be based entirely on predicted data. Without some type of compensatory mechanism this inaccuracy can build up over time resulting in missing the mark on imposed time limits (note that this is not a purely theoretical problem, as this effect was produced during unit testing during an attempt to enforce a 1% CPU limit under relatively high utilization and high application concurrency).

One possible approach considered for ameliorating this effect is to increase the length of the scheduling cycle so as to allow enough time to smooth out the effects of this type of inaccuracy. Unfortunately this approach also yields the undesired side effect of both decreasing the granularity of scheduling accuracy (with the target allocations being enforced across a larger timeframe of 5 or 10 seconds rather than every second), and also decreasing the responsiveness of the dispatcher to external configuration changes.

In order to avoid the above side effects and to keep the dispatcher granularity and/or accuracy in line with similar OS WLM capabilities, an error correction mechanism for CPU limits is introduced. The error correction mechanism operates by having the scheduler thread maintain history of the error incurred in each priority class that exceeded a CPU limit within recent scheduling cycles.

When the scheduler thread performs processing at the beginning of each scheduling cycle, the scheduler looks for any priority classes that were predicted to have hit their CPU limit in the previous cycle, and for each of these the scheduler computes the difference between their target maximum cycle time limit and how much CPU the time intervals completed in that priority class actually consumed (this data is obtained from the diagnostic monitoring metrics collected as part of dispatcher operation), referred to as the "residual limit error".

When the scheduler thread computes the priority class cycle time limit for the next scheduling cycle, it applies the current residual limit error for that priority class to the limit calculation to compensate for any error incurred in the previous cycle (so for example, if the limit is hit on the previous cycle but actually under consumed the CPU by 150 μs, the limit is increased by 150 μs for the next cycle to compensate and smooth out inaccuracies over time). In the rare case where the error incurred is so large that the error cannot be compensate for during a single scheduling cycle, compensation is performed to the maximum degree possible and any remaining residual error is carried forward to be applied to subsequent cycles.

Unit testing of the error adjustment algorithm has shown that it significantly improves our limit accuracy in the aforementioned problem scenario.

In order to support CPU limits correctly in virtualized environments, certain embodiments of the present invention use OS specific APIs (where available) to determine the total CPU capacity that was available to the virtual host over the most recent scheduling cycle. In such cases the CPU limit calculations described above could be updated as follows:

Max cycle time=% CPU limit×Available cycle time

Available cycle time=CPU capacity available over previous scheduling cycle

In this case, the CPU capacity would represent the actual CPU cycles a hypervisor had assigned to the current host, allowing the target CPU time limit to be correctly computed relative to that dynamic capacity. As an example, the AIX operating system makes this information available to applications through the tot_dispatch_time value returned by the lpar_get_info( ) API call used by AIX.

Priority Inversion Avoidance: priority inversion avoidance is a specific optimization provided within the DB2 WLM Dispatcher for specific short duration synchronization primitives that may come under heavy contention by tasks of differing priorities. The following additions are made in the dispatcher callback hooks that are invoked when a thread enters or exits a blocking state. If the specific synchronization object is flagged as high priority and the WLM dispatcher requires the thread be blocked on the run queues, the thread is placed at the very front of the run queue so that it is the next thread served. The thread's time slice is flagged as accelerated. If the specific synchronization object is flagged as high priority, and the last time slice the thread executed was accelerated, the thread will yield the current time slice to compensate for any priority boost incurred the last time the synchronization object (e.g., latch, mutex, critical section) was obtained or entered.

The priority "boost" when exiting a blocking state ensures that a lower priority thread does not impede the progress of high priority threads waiting on the same synchronization object, as this could otherwise drag down the performance of the high priority threads such that they are on par with the lower priority thread. To avoid any scenarios where the low priority thread is able to reenter a blocking state on the same synchronization object within one time slice, thereby allowing it to "cheat" and continually exceed its target CPU allocation, the thread is forced to yield its time slice and re-queue on the run queue before being allowed to compete for the synchronization object if its current time slice is flagged as accelerated.

In DB2 LUW, this mechanism is specifically applied to buffer pool page latching. When database jobs are reading buffer pool pages for specific objects, they should briefly latch these in exclusive mode in order to fix them in the buffer pool and ensure they won't be evicted. If multiple jobs are competing for this latch, it can cause higher priority jobs to slow down as low priority jobs linger in the run queues waiting for permission to run upon having obtained the latch, where this can cause a high priority workload's CPU allocation to be dragged down to the same level as a low priority workload's allocation, even for read only workloads, due to contention on this latch. The priority inversion optimization above allows this situation to be avoided, which is something that would not generally be possible in an externally implemented OS workload manager.

Figure 6:
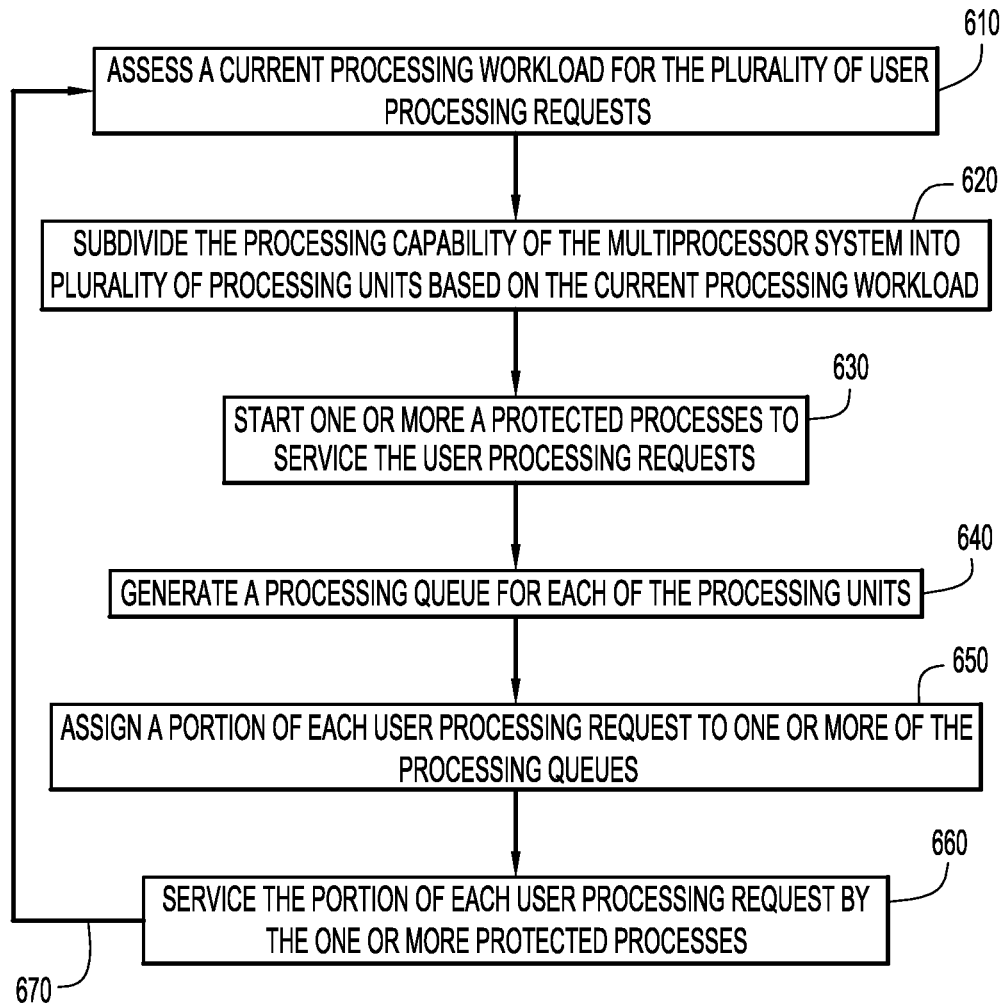
FIG. 6 is a procedural flow chart of operation of runtime dispatching queues in a multi-partitioned multiprocessor environment according to an embodiment of the present invention.

A manner in which queuing module 16 and dispatching module 20 (e.g., via a server system 10 and/or client system 14) perform CPU allocation according to an embodiment of the present invention is illustrated in FIG. 6. Specifically, a current processing workload for the plurality of user processing requests is assessed at step 610. The processing capability of the multiprocessor system is subdivided into plurality of processing units (e.g. processor or cores) based on the current processing workload at step 620. One or more protected processes (e.g., kernel threads) are started for each of the processing requests at step 630.

A processing queue is generated for each of the processing units at step 640. A portion of each user processing request is assigned to one or more of the processing queues at step 650. The assignment may be based on a priorities and/or service classes as described herein. The portion of each user processing request is serviced by the one or more protected processes at step 660. The process repeats itself at a periodic time interval (e.g., a time slice) at step 670.

Embodiments for Processor Multi-Partitioning

As described above, a middleware system like a database manager can support various configurations, some of which may involve running multiple instances of the software on a single host. A distributed database system, for example, may run multiple logical servers on a single host to manage different data partitions. Likewise in a multi-tenancy environment it might be desirable to be able to run multiple instances of a middleware server on a host to allow improved resource and configuration isolation for different client workloads and applications.

In such environments it is desirable to leverage workload management solutions available in the middleware. In a system such as a distributed database system, workload management capabilities are key to providing reliable support for mixed workloads within the database, while in a case where separate individual servers are being run for isolation purposes it is desirable to leverage workload management capabilities to help isolate resource usage between different instances of the server. Unfortunately, running in an environment with multiple server instances on the same host presents additional complexities for a middleware based CPU provisioning solution that are presented in the single server instance described above, namely:

The typical embodiments operate within the context of a single instance, making it unable to coordinate the allocation of CPU time between instances, and may be largely ineffective if the goal is to implement CPU provisioning between instances.

Operating within the context of a single instance also means that CPU limits cannot be applied in aggregate to a specific application running workloads across instances. As an example, in a shared-nothing distributed database environment, a job submitted by an application is typically subdivided into smaller jobs that are distributed and run on individual server instances managing some subset of the overall data. For cases where multiple logical server instances are run on a single host it would be desirable to be able to place a CPU limit that would limit the aggregate CPU consumption across all logical servers for the jobs being run on behalf of a particular application or workload. This cannot be easily accomplished with a middleware based workload manager that runs within the context of a single server.

Several basic approaches can be used to attempt to bridge the limitations, but each of these have their own complexities and drawbacks:

One way to support limits on the CPU usage of a particular application or workload that is distributed across servers is to implement them as individual fractional limits on each individual server (for example, if a 10% limit is desired on workload A across 10 logical server partitions, workload A would be limited to 1% of the CPU on each of the server partitions). This allocation mechanism is effective in cases where the application is driving very balanced processing on each server. In cases where there is any skew in CPU requirements, this approach results in over-throttling of the CPU on servers executing heavier work leading to underutilization on servers executing lighter work, as the workload manager may not be able to redistribute the available CPU capacity based on the relative resource requirements for the portion of the workload running on each one.

Any approach that involves communicating information between servers in order to attempt to make synchronized scheduling decisions, even using a very low latency mechanism, is a non-starter from a performance perspective due to the granularity of the scheduling required by the solution. In other words, the performance impacts of such an approach would be too high to be effective.

An approach that involves sharing the workload manager infrastructure between instances would be a desirable solution for allowing task scheduling to be consolidated across instances, but it also carries numerous challenges:

Scheduling decisions should somehow be centralized and coordinated between multiple instances without incurring significant overhead.

An efficient mechanism is required to allow the scheduling to handle the blocking and unblocking of threads across instances with minimal overhead.

In more advanced configurations, the approach should deal with the fact that individual instances may be affinitized (i.e., the software should execute on a specific set of processor and memory) to specific cores or memory groups within the host (as an example, servers for multiple logical partitions in DB2 are often each affinitized to an independent set of CPU cores on the host). In this type of environment the CPU workload manager needs to ensure that dispatched threads are balanced across the affinitization groups, or it risks underutilizing the system resources and degrading performance. At the same time, any approach should ensure that non-local memory accesses can be minimized so as to keep performance overhead to a minimum.

The typical fallback due to these complexities would be to resort to the usage of an OS workload manager when dealing with multiple instances on a single host, as this technique would not be subject to the same limitations, operating by definition within the OS, at the overall host level. This approach however prevents leveraging the benefits of a middleware based approach, which are of key value in certain environments that support multiple partitions or instances in an efficient and transparent manner.

The present invention embodiments operate by using a single scheduling infrastructure shared across all server instances on the host. This scheduling model allows for making scheduling decisions at the host level, taking into account the CPU consumption for a given workload/application across all logical server instances, rather than attempting to achieve an approximation of the desired scheduling by making local decisions within the scope of each server. Host level decision making eliminates any complexities associated with handling skew in CPU consumption across servers on a given host, and ensures that the solution can achieve similar results to that of OS WLM implementations.

When each server instance is started, it can attach to a well defined shared memory segment containing the task scheduler infrastructure; the first server up can allocate the segment and initialize the shared memory and related control structures and run queues, while subsequent servers can merely attach to the existing set. The last server to shut down is responsible for freeing the shared memory and the associated scheduling infrastructure.

Within the shared memory segment that holds the scheduler infrastructure, a set of shared per thread "wait elements" are reserved that can be allocated by each thread starting on any server instance on the host, and stored as a pointer in their thread local storage. The operation of wait elements or wait primatives is further described in connection with FIG. 7. Each thread can also allocate any resources required to allow it to selectively block and be posted across server processes (a typical embodiment might use an OS semaphore for this purpose), and may save the applicable identifier information in the wait element. When a thread enters one of the run queues in the scheduler it may do so by adding its wait element to the shared run queue, and then waiting on its corresponding wait resource. When a running thread releases its time slice, it de-queues the wait element at the head of the run queue, and posts the corresponding thread to wake it up and allow it to run using the identifier information from the wait element. Since the wait elements come from the same shared memory as the scheduling infrastructure, the queuing/ posting mechanism can be used transparently across different servers and allows an existing queuing mechanism to be utilized without any additional changes or layers of overhead.

In order to coordinate scheduling decisions on the host, each instance is responsible for running its own scheduling thread. However, each scheduling thread is required to attempt to conditionally acquire a common lock or mutex in the scheduler infrastructure at the beginning of each scheduling cycle. Only one instance can succeed in obtaining the lock and is then be responsible for running scheduling tasks such as resetting CPU limits and re-dispatching threads at the beginning of each scheduling cycle for all threads across all instances. This protocol avoids the need to coordinate separate scheduling within each server by having a single server take over the scheduling for all servers running on the host. When the instance that is currently running this master scheduling thread is shut down, it releases the lock or mutex, allowing one of the scheduling threads on the other instances to obtain the lock and take over running the scheduling logic. This ensures that so long as one or more server instances are active, there is a designated scheduling thread for performing the required scheduling tasks on the host.

In order to support environments where server instances may be affinitized to a subset of the processor cores on the system, present invention embodiments arbitrarily tag each run queue as belonging to a particular core on the system (although there is technically no fixed relationship between a given run queue and a given core). When a thread enters the run queues, the load balancing algorithm that determines which run queue to use selects between the run queues that correspond to the cores that the particular server is affinitized to. This has the implicit effect of queuing tasks bound to specific cores together and dispatching a number of threads that's exactly proportional to the number of cores within the affinitization group. By organizing the internal run queues in this way, present invention embodiments avoid the case where, for example, multiple tasks may be dispatched on more than one core, only to find that all of the tasks belonged to a server that was bound to a single core. This would of course lead to system underutilization and negative performance impacts. In present invention embodiments these tasks would necessarily be queued on the same run queue, ensuring that only one of them would be able to be dispatched at a time, and that any other tasks that were dispatched simultaneously from other run queues would necessarily be affinitized to other cores.

A second consideration with processor affinity is related to memory affinitization. On many platforms, memory affinitization operates on a 'first touch' model, where pages in shared memory are allocated based on the processor binding for the first thread that touched the page or caused the page to be committed to physical RAM. Present invention embodiments leverages this model to attempt to ensure that memory accesses to the shared scheduling infrastructure by a server instance is local to the processors that server is affinitized to whenever possible.

To implement local shared memory, present invention embodiments modify the initialization of run queues in an affinitized environment so that the first server affinitized to a particular core allocates and initializes the corresponding run queue within the shared memory segment. This form of initialization allows maximum probability that the applicable run queues are allocated from memory that is local to the processor in question. Similarly the wait element allocation is split into separate per-server or instance pools, ensuring that each server allocates and frees its wait elements from the same area of memory, and that this memory has maximum probability of being local to the processors the server is affinitized with. In practice, this form of wait element allocation avoids memory overhead when en-queuing and de-queuing elements from the run queues, limiting the required remote memory accesses to cases where the shared scheduling memory area is referenced for each workload. In laboratory tests, these remote accesses have been found not to be frequent enough to cause a noticeable degradation in performance.

In summary, the multi-instance or multi-partition approach, in contrast to the single queue per processor techniques described above, provides a method that a middleware based CPU provisioning mechanism that can be transparently adapted to operate in a multiple instance or partitioned server environment, enabling host level CPU provisioning that can be managed and enforced across all the middleware server instances on a host machine with minimal additional overhead and complexity. This allows environments that run multiple logical instances of a middleware server (e.g., a distributed database system like DB2), to leverage the benefits of a middleware based workload manager, without incurring any of the major drawbacks usually associated with this type of environment.

Briefly referring once again to FIG. 1, the various components shown (e.g., processors 15, memory 35, etc.) are the same for implement multi-partition or multi-instance embodiments of the present as they are in the single queue to single processor model described above. In this example, memory 35 and processor 15 may be partitioned according to the techniques described herein. In this regard, queuing module 16 and dispatching module 20 are adapted to perform the techniques described herein according the multiple partition or multiple server instance model.

In order to facilitate understanding of the multi-instance techniques described above, a specific example is now described.

A common shared memory set is allocated and shared across all instances of the middleware software running on a particular host. The shared memory is leveraged in order to make the task scheduling infrastructure shared across the server instances. The shared memory model allows the task scheduler to make scheduling decisions at the host level taking into account the CPU consumption for a given application workload across all logical instances, rather than attempting to achieve an approximation of the desired scheduling by making local decisions within the scope of each server. This eliminates any complexities associated with handling skew in CPU consumption across logical partitions on a given host, and ensures that the task scheduler can achieve similar results to that of OS WLM based solutions (which by definition operate outside of the middleware, and therefore, are able to maintain a host-global view of resource consumption). The use of multiple run queue objects (allocated based on the number of cores on the overall host), ensures scalability in large environments by eliminating global contention on the scheduler run queues.

Figure 7:
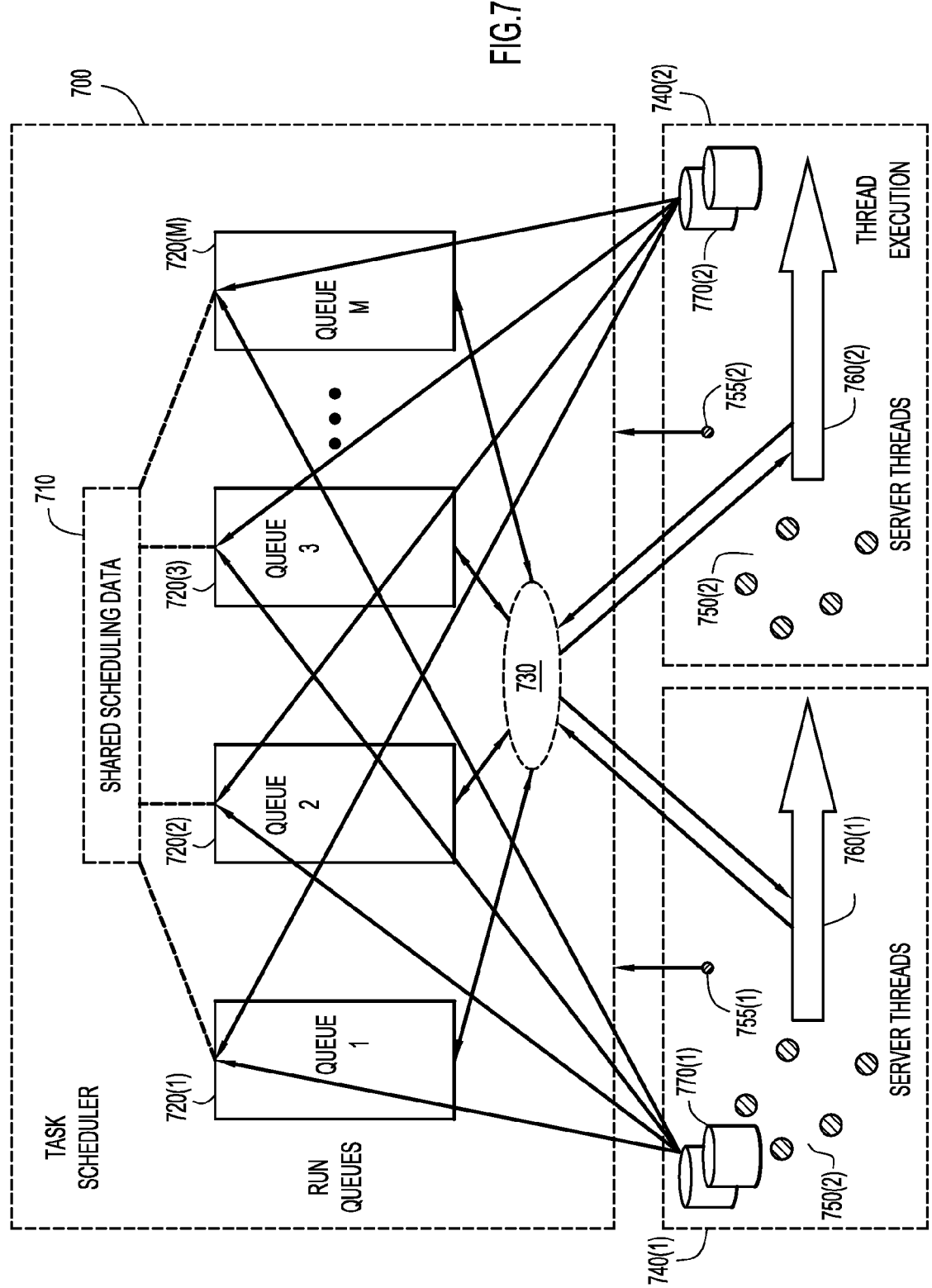
FIG. 7 is a flow diagram illustrating a manner in which CPU processing is allocated in a multi-partitioned multiprocessor environment according to an embodiment of the present invention.

An example architecture for CPU provisioning in a multi-partition or multi-server instance environment is illustrated in FIG. 7. The architecture includes a shared memory area 700 that stores shared scheduling data 710, a plurality of run queues 720(1)-720(M) and scheduler logic 730 (e.g., as implemented by dispatching module 20). The shared memory may also be referred to as a task scheduler to indicate its overall mission. Each run queue 720 is responsible for managing a subset of the global dispatch concurrency allowed on the system (e.g., as implemented by queuing module 16) with each run queue having its own serialization. In this example, two server instances 740(1) and 740(2) (e.g., database servers as an example that would use storage facilities 770(1) and 770(2)) have been started or instantiated on processing partitions for a single processor.

Each server instance 740 has corresponding server threads 750(1) and 750(2) to act as agents that are allowed to execute based on the scheduling logic 730. Server threads 750 enter one of the run queues to request dispatch, and are either allowed to run (if the concurrency limits for that run queue have not yet been met), or are forced to queue and wait for a dispatch interval to become available if scheduler logic 730 has already distributed all its available dispatch intervals. To enable scalability and reduce contention, one run queue object is allocated per physical CPU core.

An individual priority class object is allocated within each run queue object 720 for each service class or workload on a database (allowing the avoidance of global serialization). Scheduling data 710 for each queue 720 is shared across all the run queue objects 720 by default, with the priority class in one of the run queues designated to contain the master scheduling data 710, and all other priority classes referencing the scheduling data in that priority class. The fields used in the scheduling data 710 are implemented as atomic counters to allow parallel access for incrementing without requiring full latch or mutex based serialization.

When the first server instance 740 (1) starts up on the host machine, it attempts to attach to the common shared memory set 700, and determine that the shared memory set does not exist. The first server instance 740 (1) performs the allocation of the shared memory set 700 and the initialization of the core run queue objects 720 within this memory. Server instance 740(1) also increments a reference count at a well known address or offset within the memory set.

Subsequent server instances (e.g., 740 (2)) and perhaps additional servers) that start up attempt to attach to the shared memory set 700. Subsequently started servers determine that shared memory area 700 does exist, and increments the reference count to indicate their registration to the shared memory infrastructure. When a server 740 shuts down, it decrements the reference count; the last server to shut down as determined by the reference count terminates the run queue objects 720 and frees the shared memory set 700.

Within the shared memory segment allocated to hold the scheduler infrastructure 700, a set of shared "wait elements" is reserved according to the following structure:

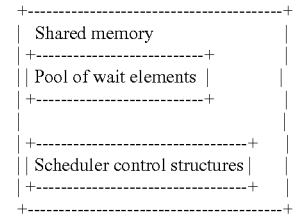

A wait element has the following example data structure:

```
Wait Element
{
    Semaphore or equivalent resource identifier
    Pointers to allow element to be chained in run queues
};
```

In a pool of wait elements, each wait element should be initialized. When the scheduler infrastructure is initialized, a pool of individual wait elements is also allocated in shared memory to use for the cross instance waiting and posting mechanism. A typical embodiment implements this pool as an array or linked list serialized by a mutex or similar synchronization primitive (e.g., a semaphore). When the scheduler infrastructure is freed, any applicable cleanup tasks required by the wait element pool are also performed.

When a thread 750 on a given server 740 is created and initialized, it allocates its own wait element from the pool of wait elements, and stores a pointer to that wait element in the thread's local storage for further reference. The thread also performs any initialization necessary to setup a resource that it can block on, and be posted or woken up by a thread running within a different process or server (a typical embodiment may use a semaphore for this purpose).

When a thread 750 on a given server 740 is terminating, the thread performs any steps necessary to release its semaphore resource, and return its wait element to the shared pool for further reuse.

The scheduler run queue infrastructure 720 uses the wait elements for queuing, i.e., the wait elements are instrumented with the pointers needed to allow them to be chained into the queue (note that an embodiment may choose to use various run queue implementations including linked lists, arrays, or priority queues). The use of wait elements allocated from the shared memory set 700 ensures that the run queue elements can be accessed by any of the server instances 740 running on the host.

When a thread 750 enters a run queue 720 and is configured by the scheduling logic to wait, the thread inserts its wait element into the run queue 720 and blocks on the applicable wait resource, and saves any state information that might be required for another thread 750 to post it and wake it up in the wait element.

When a thread 750 finishes a time slice, it de-queues the wait element for the next available thread 750 from the run queue 720 based on the scheduling logic 730, and then posts or wakes the thread 750 up based on the information stored in that wait element. Note that in this example that the storage areas 770, are each coupled to each queue 720, thereby enabling cross-scheduling from all user processing requests 750 to all servicing queues 720 as schedules by scheduler logic 730 as indicated by the connecting lines as viewed in the figure. The shared memory 710, queues 720, and instances 740 may each be affinitized to physical processors and/or memory or portions of memory 700.

In order to coordinate scheduling decisions in the task scheduler 700, a "control" mutex or similar resource is instrumented in the shared scheduler infrastructure, as shown in the structure below:

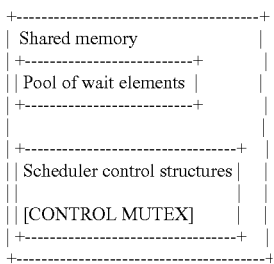

Each individual instance 740 that shares the scheduling infrastructure 700 runs its own scheduler thread 755(1) and 755(2) (e.g., as described above for the single processor model), yet with the following modifications:

The scheduler thread 755 conditionally attempts to obtain the control mutex. Upon failing to obtain the control mutex the thread waits until the next scheduling cycle, and repeats the attempt, continuing until it either successfully obtains the mutex, or until it is terminated because its server instance is shut down.

Upon successfully obtaining the control mutex, the scheduler thread 755 is considered to be the "master" scheduling thread, and proceeds to perform the normal scheduling tasks in the scheduling infrastructure. Since the scheduling infrastructure 700 is shared across instances, this thread is performing the CPU scheduling for all the instances 740 on the host.

When the server instance 740 that holds the control mutex is shut down, it releases the mutex, thereby allowing the scheduling threads 755 on other instances to compete to take over as the scheduling master for the host.

The mutex control mechanism ensures that scheduling decisions on the host are coordinated by only a single thread 755, while removing the need to start any standalone infrastructure to manage this thread. One of the active server instances 740 on the system is responsible for the scheduling across all servers. This single instance scheduling control mechanism allows the scheduling algorithm 730 to continue to operate in a similar fashion to the single instance or single server model while actually managing multiple instances 740.

In environments where server instances 740 are affinitized to a subset of processor cores on the system, there are at least as many run queues as individual cores, and each run queue is enumerated to be associated with a particular core (although there is technically no fixed relationship between a given run queue and a given core). Each individual server instance 740 tracks which processor cores it has been bound to using the same enumeration.

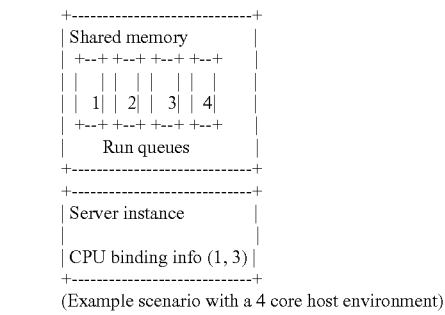

(Example scenario with a 4 core host environment)

When a thread needs to enter the run queues 720, the load balancing algorithm 730 used to select the specific run queue to use only selects between those run queues whose numbers match its processor binding information. In the example scenario shown above the server instance is affinitized by only allowing the server instance to run on cores 1 and 3, but not on cores 2 and 4. By having a common enumeration between the run queues 720 in the task scheduler 700, we can achieve the desired task distribution by only queuing user requests/server threads on the corresponding run queues (1 and 3). The one queue to processor core has the implicit effect of queuing tasks bound to specific cores together and only dispatching a number of threads that is proportional to the number of cores within the affinitization group. By lining up the run queues 720 with the individual cores in this manner, the scheduler infrastructure dispatching logic 730 implicitly ensures that the group of threads running at any one time are balanced across the separate affinitization groups.

In order to ensure that the memory allocated for scheduler run queues 720 has the maximum chance of being local to the processors that given server instance 740 is bound to, the scheduler initialization process in an affinitized environment is modified so that a server 740 initializes only the run queues 720 associated with the processors it is bound to. This ensures that this server 740 is the first process to touch the pages for the run queues 720 it is allowed to use, causing the OS to attempt to commit these pages from processor local memory.

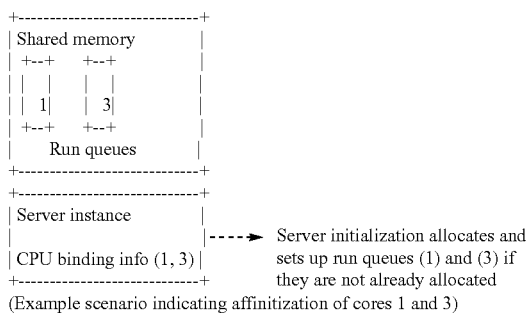

(Example scenario indicating affinitization of cores 1 and 3)

As shown below, the wait element pool is also split into separate per-server or instance pools that are allocated by each individual server as they start up. This ensures that the wait elements themselves have maximum probability of being allocated from memory that is local to the processors the server instance is bound to.

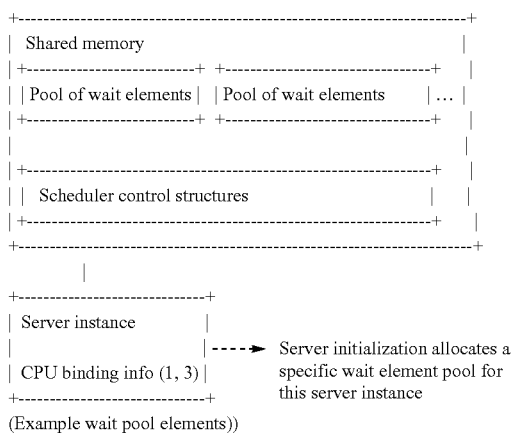

(Example wait pool elements))

By organizing the shared memory initialization in this manner, present invention embodiments ensure that the run queue infrastructure 720 associated with the processors in a specific server 740 are affinitized to both the run queue objects themselves 720, and the wait elements used by threads 750 to add themselves to the run queue that is allocated from processor local storage, if it is available. This allows run queue operations for a particular server 750 to avoid remote memory accesses and minimize extra performance overhead when supporting multiple affinitized server instances.

Figure 8:
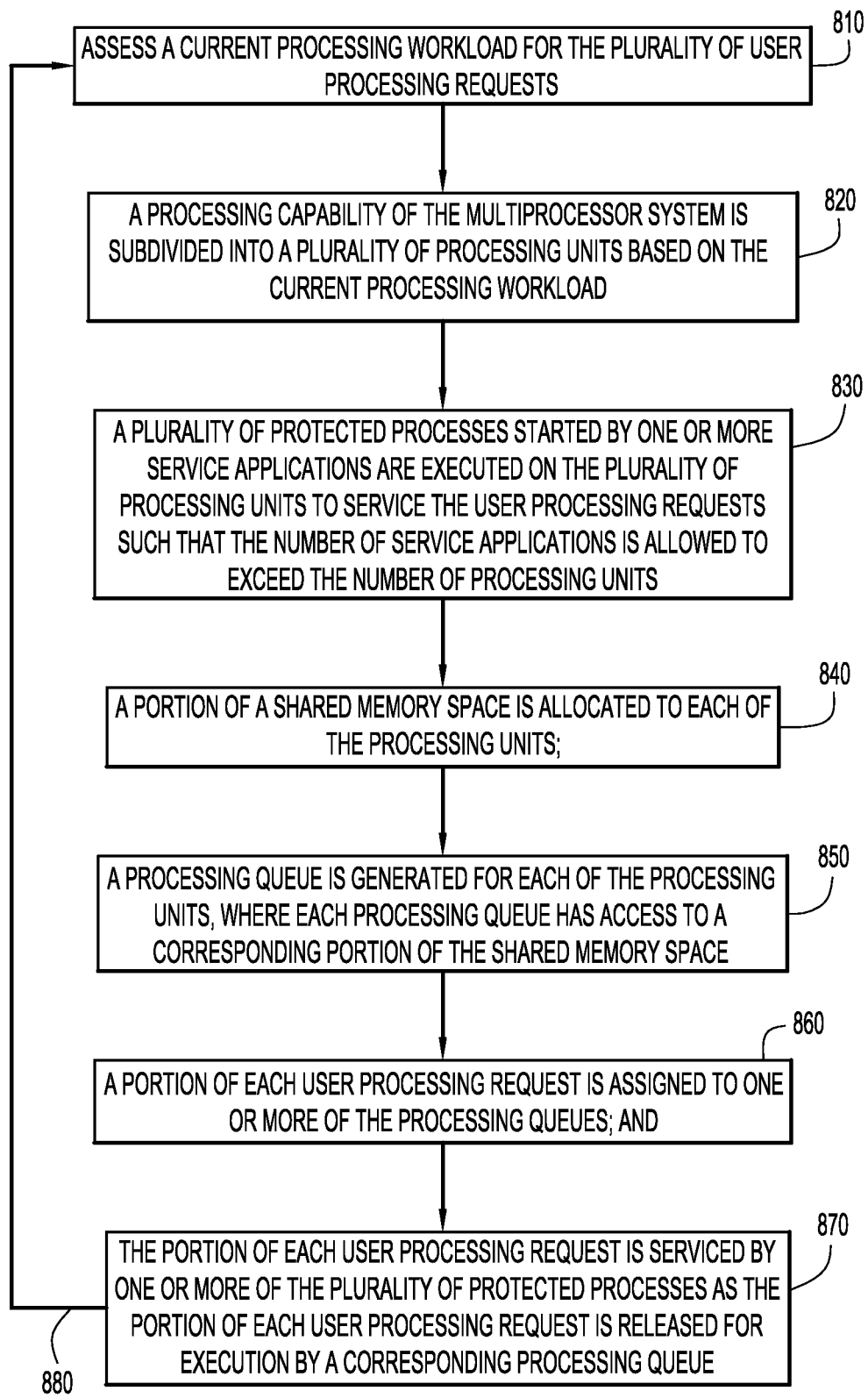
FIG. 8 is a procedural flow chart illustrating a manner in which CPU processing is allocated in a multi-partitioned multiprocessor environment according to an embodiment of the present invention.

A manner in which queuing module 16 and dispatching module 20 (e.g., via a server system 10 and/or client system 14) performs CPU allocation in a multi-partitioned environment according to an embodiment of the present invention is illustrated in FIG. 8. Specifically, a current processing workload for the plurality of user processing requests is assessed at step 810. A processing capability of the multiprocessor system is subdivided into a plurality of processing units based on the current processing workload at step 820. A plurality of protected processes (e.g., a kernel or OS process) started by one or more service applications are executed on the plurality of processing units to service the user processing requests such that the number of protected processes is allowed to exceed the number of processing units at step 830.

A portion of a shared memory space is allocated to each of the processing units at step 840. A processing queue is generated for each of the processing units at step 850, where each processing queue has access to a corresponding portion of the shared memory space. A portion of each user processing request is assigned to the processing queues at step 860. The portion of each user processing request is serviced by one or more of the plurality of protected processes as the portion of each user processing request is released for execution by a corresponding processing queue at step 870. The process may repeat itself at a periodic time interval (e.g., a time slice) at step 880.

It is appreciated that the embodiments described above and illustrated in the drawings represent only a few of the many ways of implementing processor provisioning by a middleware software system.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, queuing module, dispatching module, etc.). These systems may include any types of monitors and input devices (e.g., keyboard, mouse, voice recognition, etc.) to enter and/or view information.

It is to be understood that the software (e.g., queuing module, dispatching module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., queuing module, dispatching module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information (e.g., databases and indexes, applications, and search results, etc.). The database system may be implemented by any number of any conventional or other databases, data stores or storage structures (e.g., files, databases, data structures or tables, data or other repositories, etc.) to store information (e.g., databases and indexes, applications, and search results, etc.). The database system may be included within or coupled to the server and/or client systems. The database systems and/or storage structures may be remote from or local to the computer or other processing systems, and may store any desired data (e.g., databases and indexes, applications, and search results, etc.). Further, any data structures may be implemented by any conventional or other data structures (e.g., files, arrays, lists, stacks, queues, etc.) to store information, and may be stored in any desired storage unit (e.g., databases and indexes, applications, and search results, etc.).

The present invention embodiments may employ any number of any type of user interface (e.g., Graphical User Interface (GUI), command-line, prompt, etc.) for obtaining or providing information (e.g., databases and indexes, applications, and search results, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for CPU provisioning in any multiprocessor system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations are apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As is appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (Java and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A multiprocessor system for efficiently allocating workload in middleware for a plurality of user processing requests among a plurality of processors comprising:
a computer system including the plurality of processors configured to:
assess a current processing workload for the plurality of user processing requests;
subdivide a processing capability of the multiprocessor system into a plurality of processing units based on the current processing workload;
execute a plurality of protected processes started by one or more service applications on the plurality of processing units to service the user processing requests such that the number of protected processes is allowed to exceed the number of processing units;
allocate a portion of a shared memory space to each of the processing units;
generate a processing queue for each of the processing units, wherein each processing queue has access to a corresponding portion of the shared memory space;
assign a portion of each user processing request to one or more of the processing queues; and
service the portion of each user processing request by one or more of the plurality of protected processes as the portion of each user processing request is released for execution by a corresponding processing queue.

2. The multiprocessor system of claim 1, wherein the plurality of processors are further configured to:
dedicate one or more of the plurality of protected processes started by one or more service applications to one of the processing units; and
dedicate one or more of the processing queues to a corresponding processing unit.

3. The multiprocessor system of claim 2, wherein said assigning comprises assigning portions of the user processing requests to the affinitized processing unit via an affinitized processing queue.

4. The multiprocessor system of claim 1, wherein said executing comprises determining by a first executing service application whether a shared memory set exists for allocation to each of the processing units, and when a shared memory set does not exist, allocating the shared memory set from available memory, and generating a first processing queue.

5. The multiprocessor system of claim 4, wherein the plurality of processors are further configured to:
increment a service application instance counter; and
obtain a control token indicating the first executing service application is a master scheduler for performing said assigning of portions of each user processing request to one or more of the processing queues.

6. The multiprocessor system of claim 1, wherein the plurality of processors are further configured to balance a processing workload associated with the user processing requests across two or more processing queues.

7. The multiprocessor system of claim 1, wherein said assigning is based on one or more of user processing request priority and user processing request service class.

8. A computer program product for efficiently allocating workload in middleware for a plurality of user processing requests among a plurality of processors in a multiprocessor system comprising:
a computer readable storage medium having computer readable program code embodied therewith, the computer readable program code comprising computer readable program code configured to:
assess a current processing workload for the plurality of user processing requests;
subdivide a processing capability of the multiprocessor system into plurality of processing units based on the current processing workload;

execute a plurality of protected processes started by one or more service applications on the plurality of processing units to service the user processing requests such that the number of protected processes is allowed to exceed the number of processing units;

allocate a portion of a shared memory space to each of the processing units;

generate a processing queue for each of the processing units, wherein each processing queue has access to a corresponding portion of the shared memory space;

assign a portion of each user processing request to one or more of the processing queues; and service the portion of each user processing request by one or more of the plurality of protected processes as the portion of each user processing request is released for execution by a corresponding processing queue.

9. The computer program product of claim 8, further comprising computer readable program code configured to:

dedicate one or more of the plurality of service applications to one of the processing units; and dedicate one or more of the processing queues to a corresponding processing unit.

10. The computer program product of claim 9, wherein said assigning comprises assigning portions of the user processing requests to the affinitized processing unit via an affinitized processing queue.

11. The computer program product of claim 8, wherein said executing comprises determining by a first executing service application whether a shared memory set exists for allocation to each of the processing units, and when a shared memory set does not exist, allocating the shared memory set from available memory, and generating a first processing queue.

12. The computer program product of claim 11, further comprising computer readable program code configured to:

increment a service application instance counter; and obtain a control token indicating the first executing service application is a master scheduler for performing said assigning of portions of each user processing request to one or more of the processing queues.

13. The computer program product of claim 8, further comprising computer readable program code configured to balance a processing workload associated with the user processing requests across two or more processing queues.

* * * * *